F. A. HART.
COMBINED TYPE WRITING AND COMPUTING MACHINE.
APPLICATION FILED DEC. 10, 1908.
1,270,411.
Patented June 25, 1918.
15 SHEETS—SHEET 10.
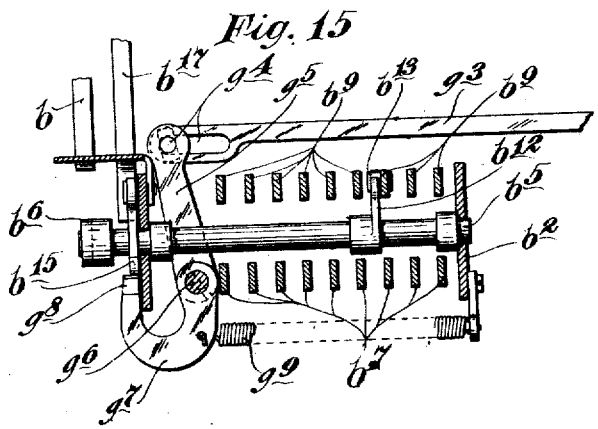
Fig. 15
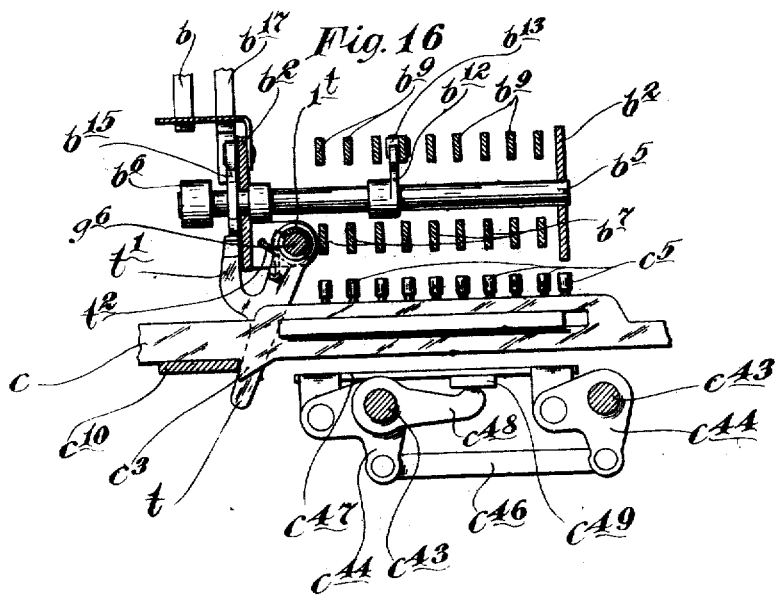
Fig. 16
Fig. 17
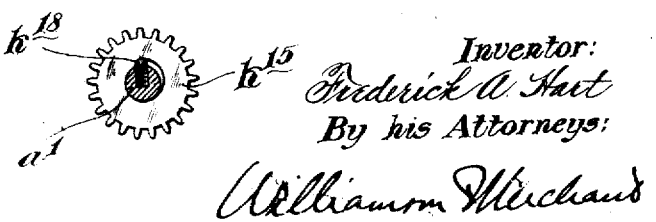
Witnesses:
L. L. Simpson
A. H. Opsahl
Inventor:
Frederick A. Hart
By his Attorneys;
Williamson Merchant

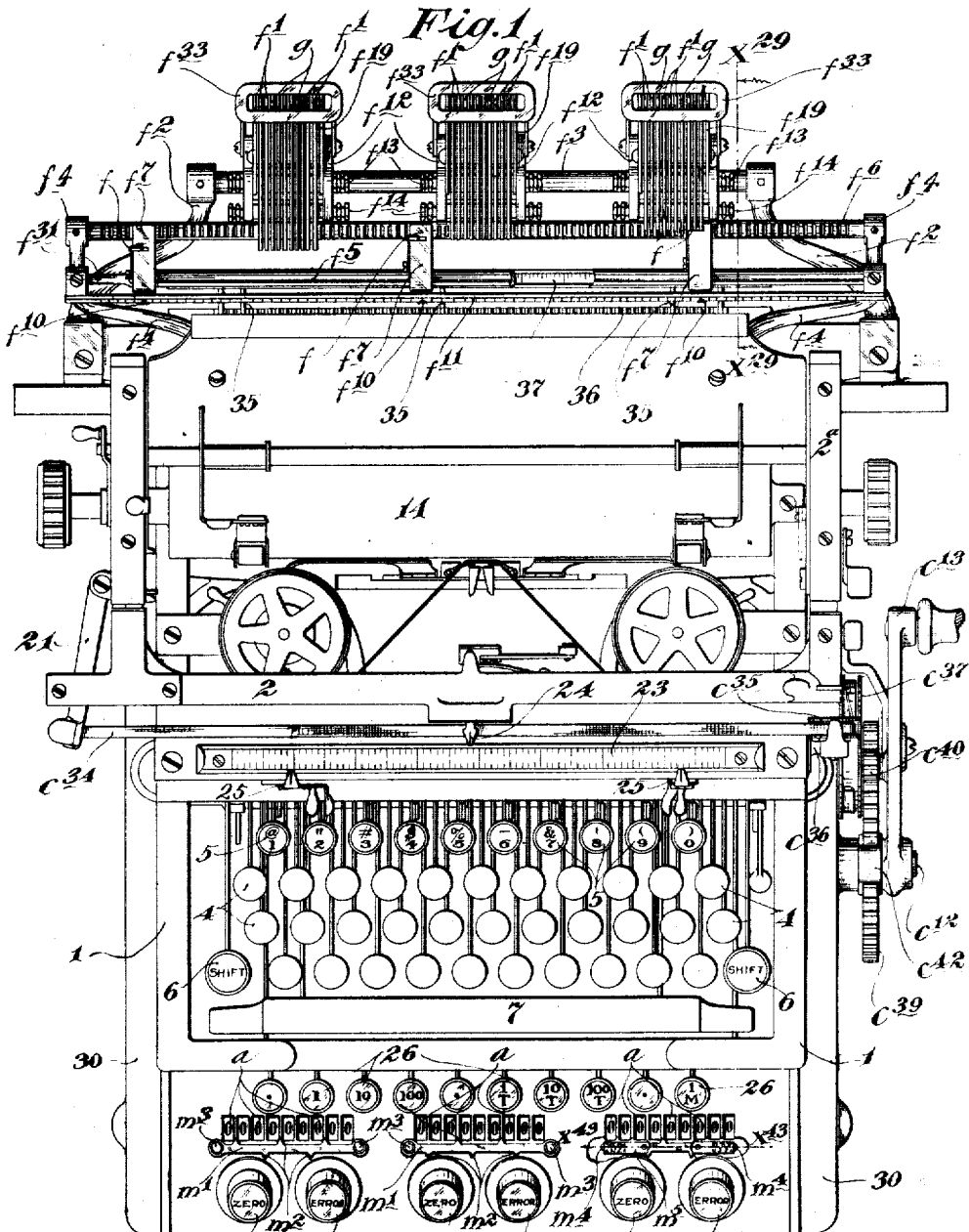

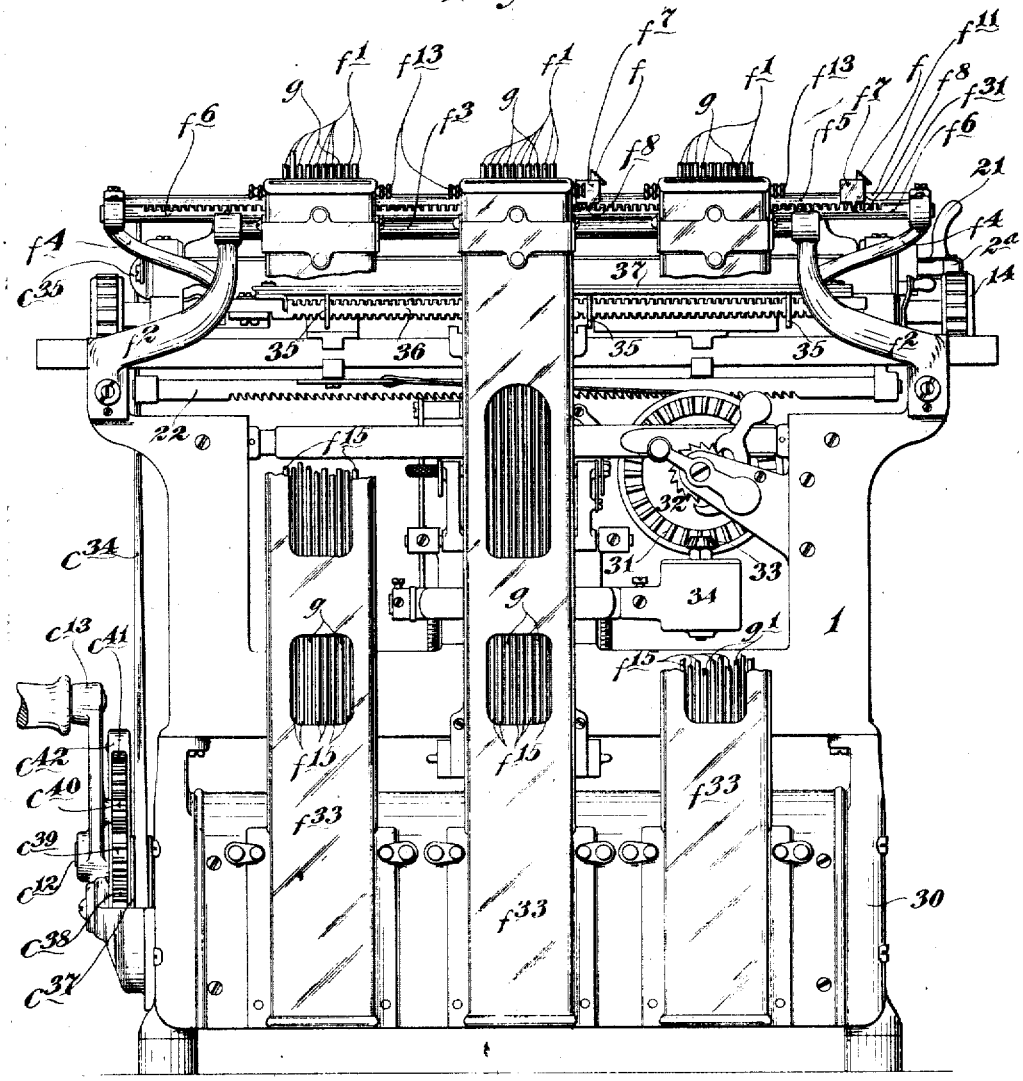

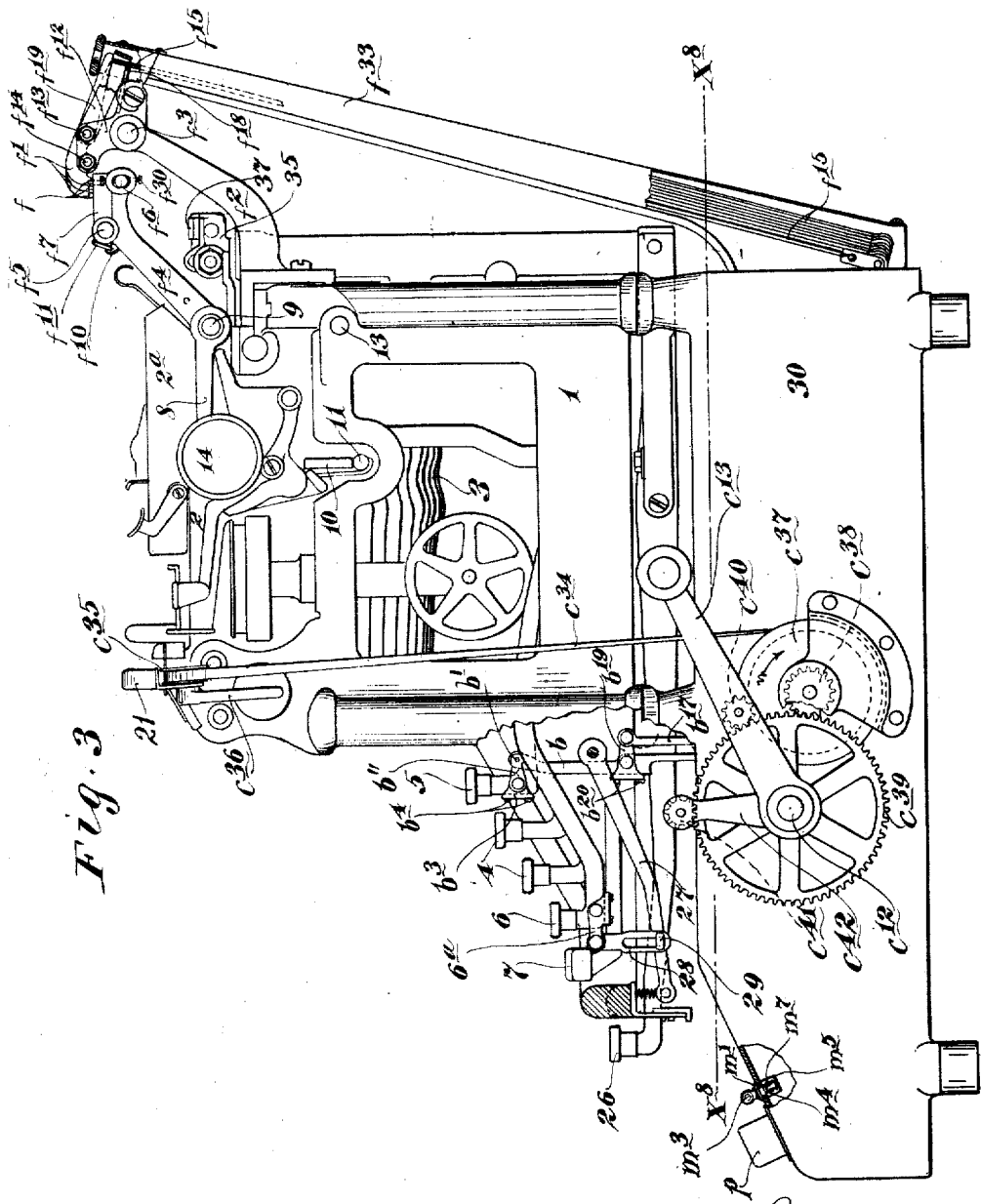

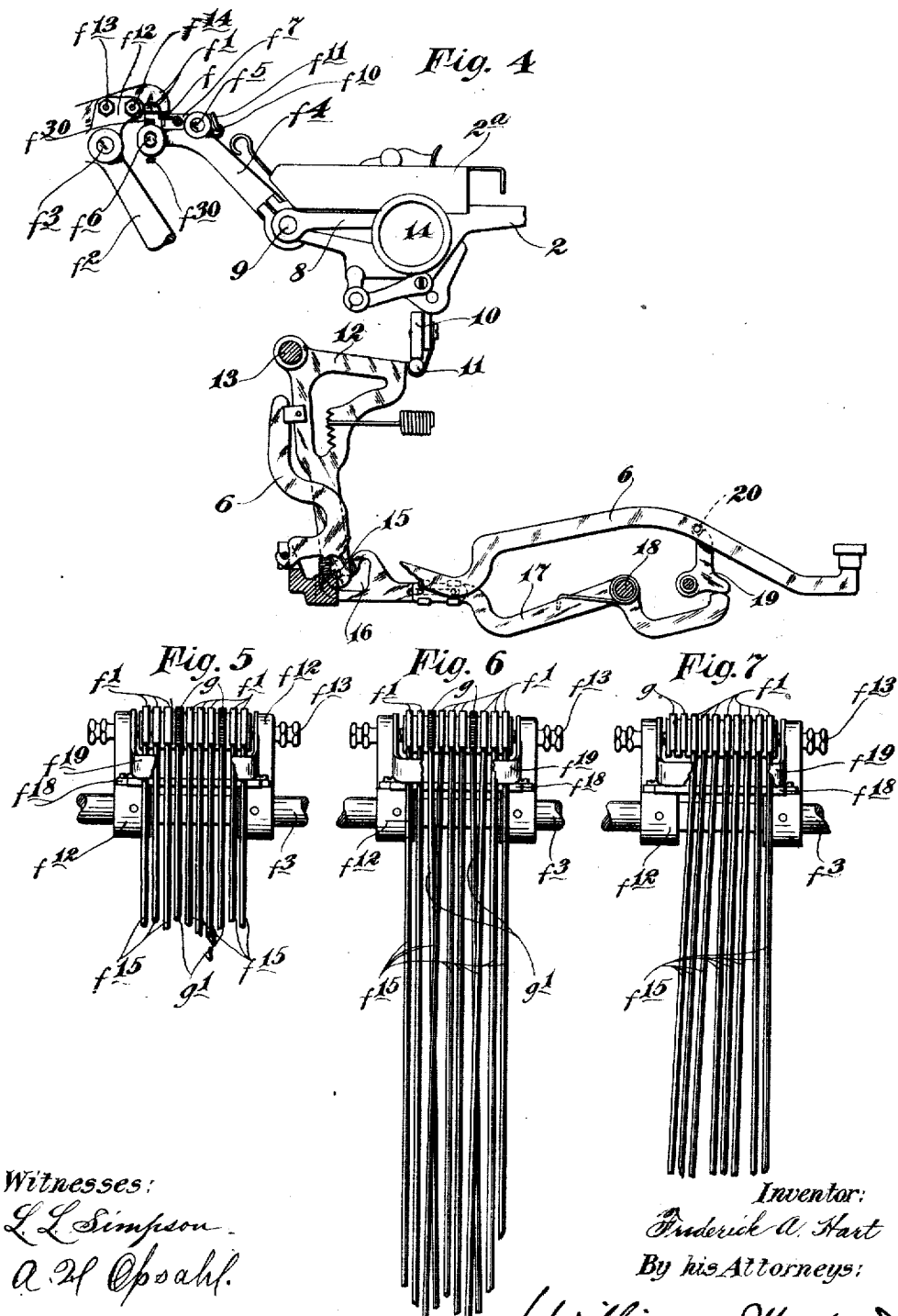

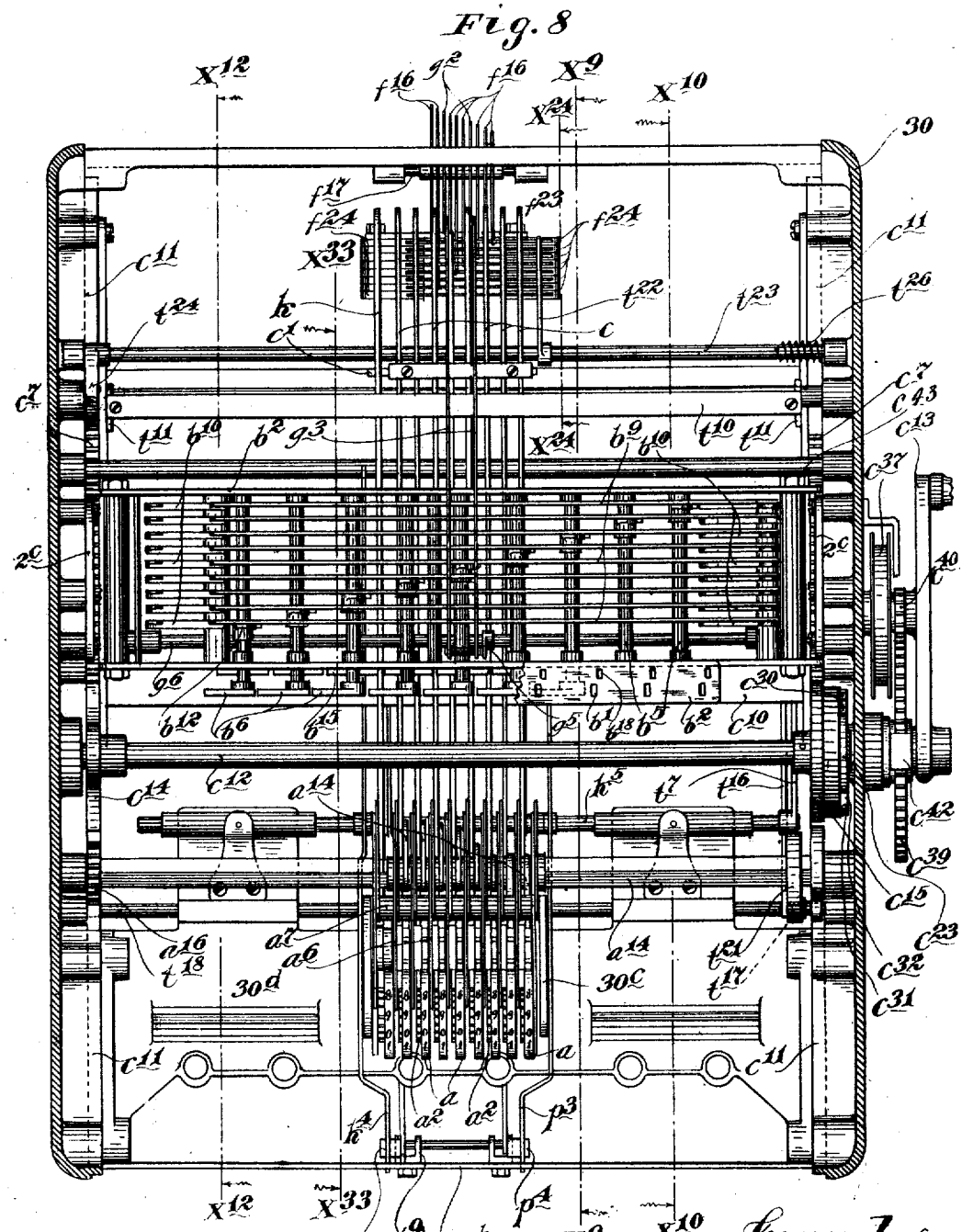

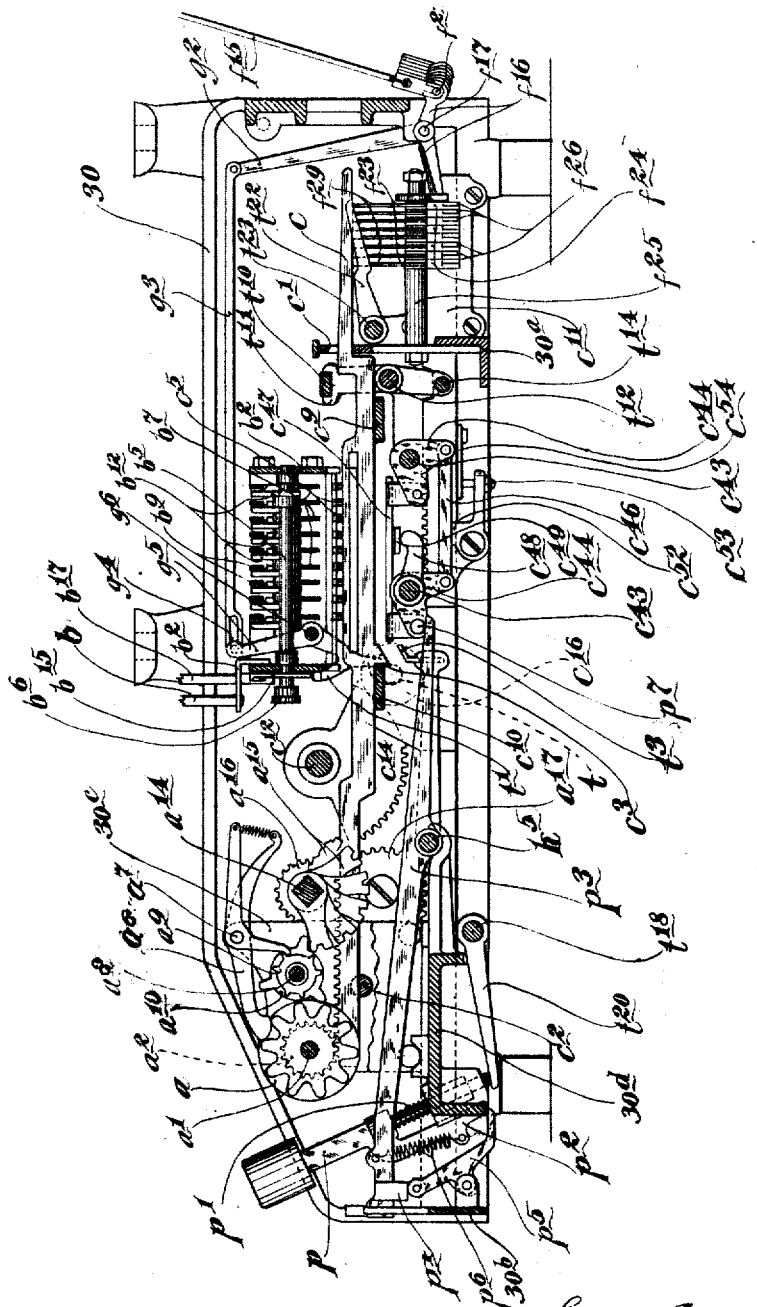

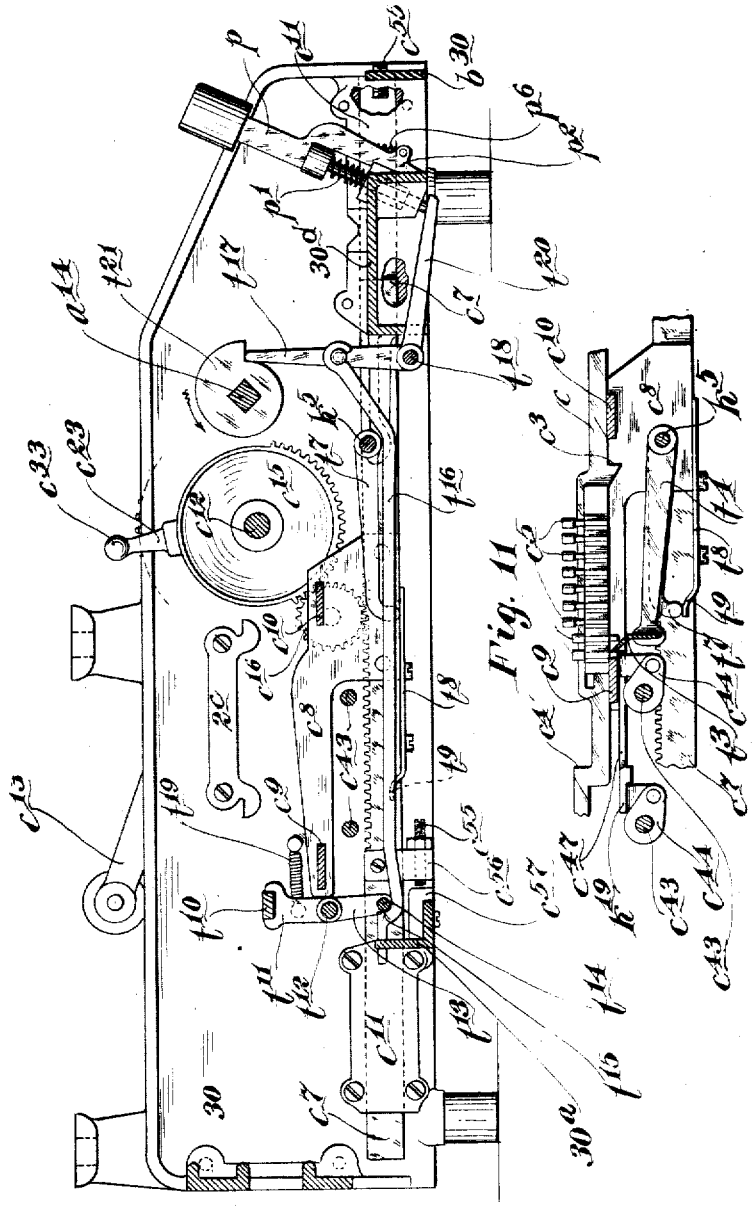
F. A. HART.
COMBINED TYPE WRITING AND COMPUTING MACHINE.
APPLICATION FILED DEC. 10, 1908.
1,270,411. Patented June 25, 1918.
15 SHEETS—SHEET 7.
Witnesses.
A. H. Opsahl.
L. L. Simpson
Inventor
Frederick A. Hart
By his Attorneys
Williamson & Merchant

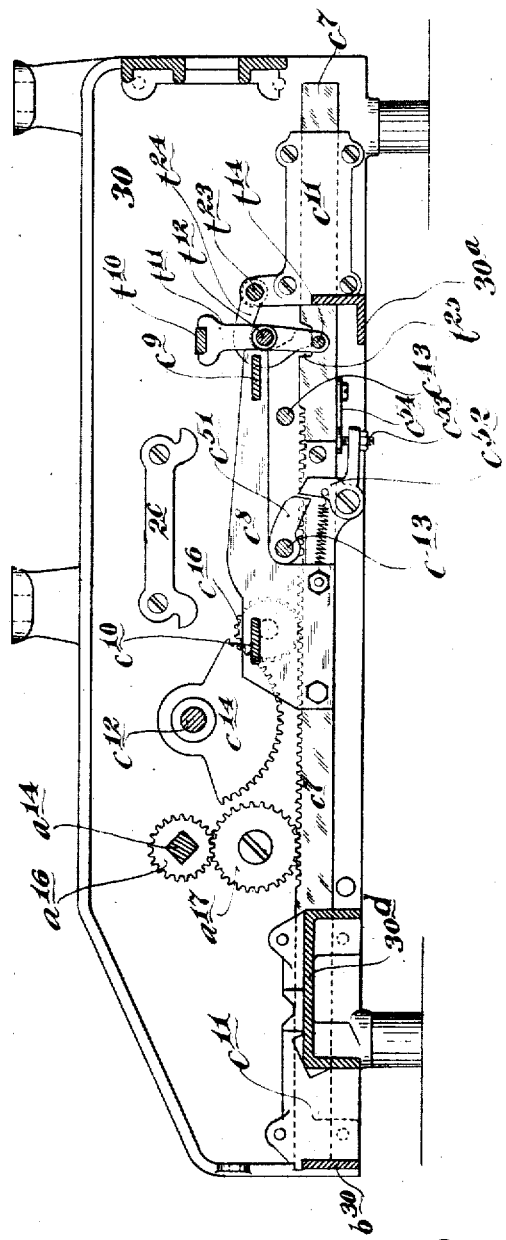

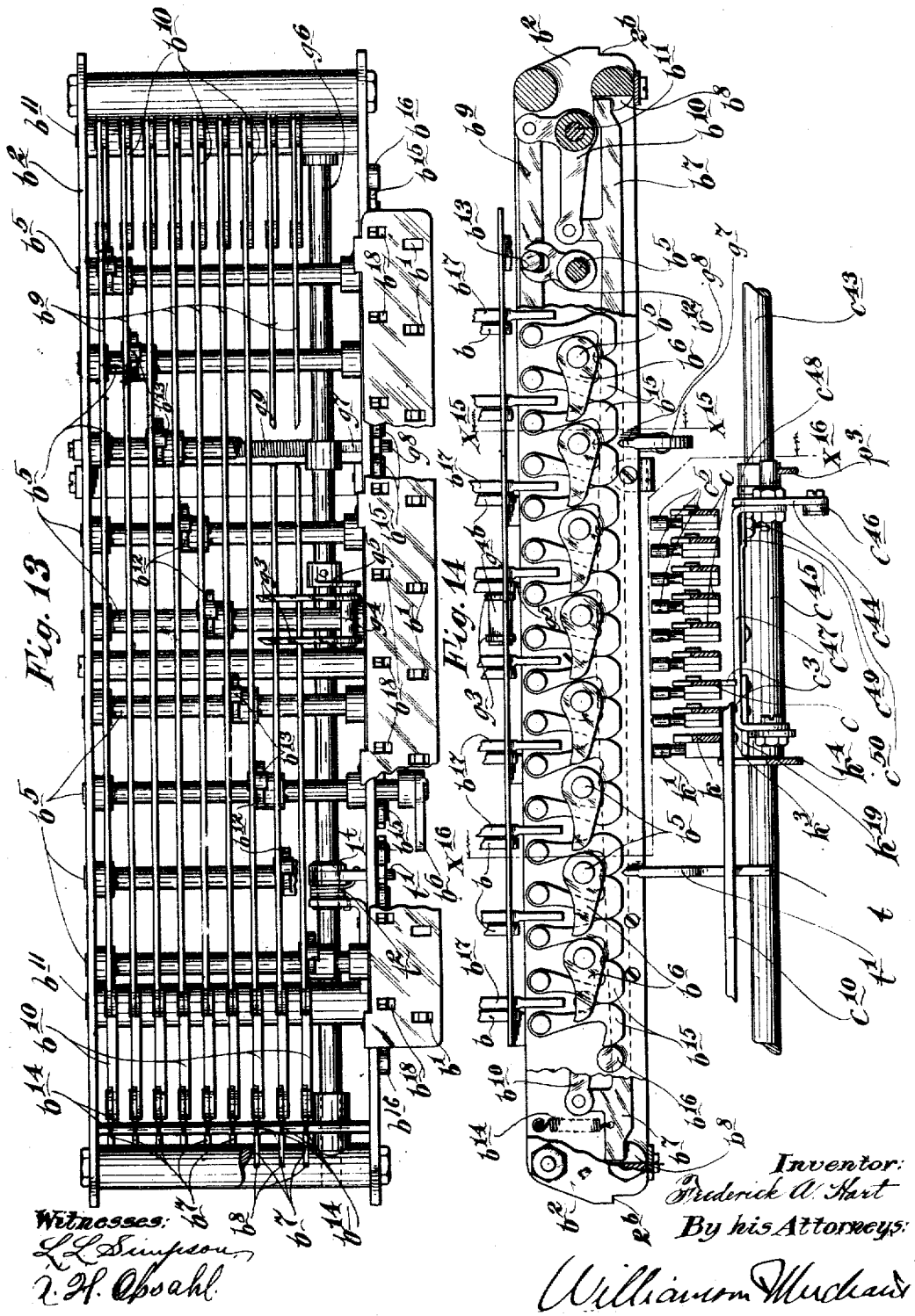

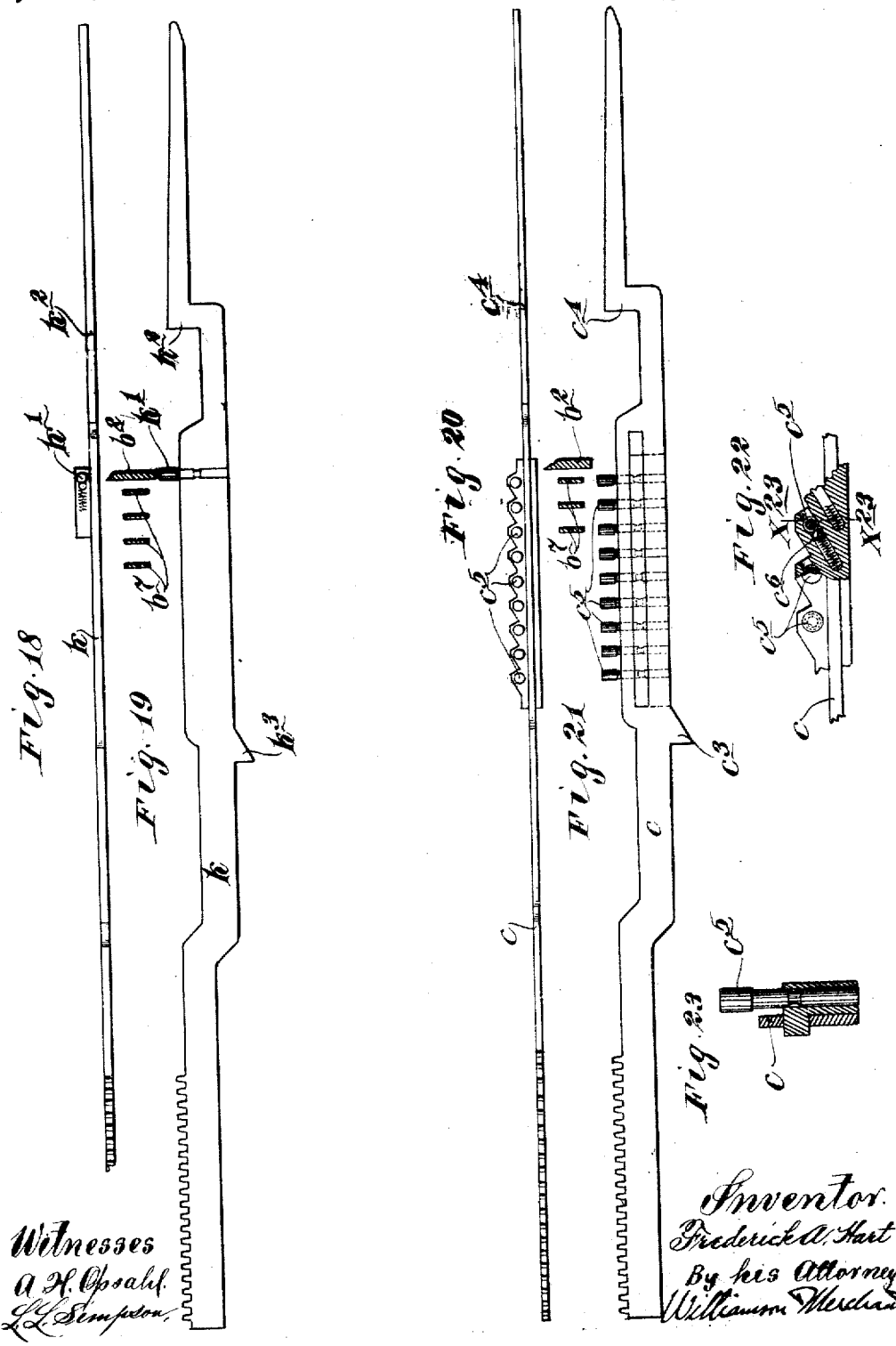

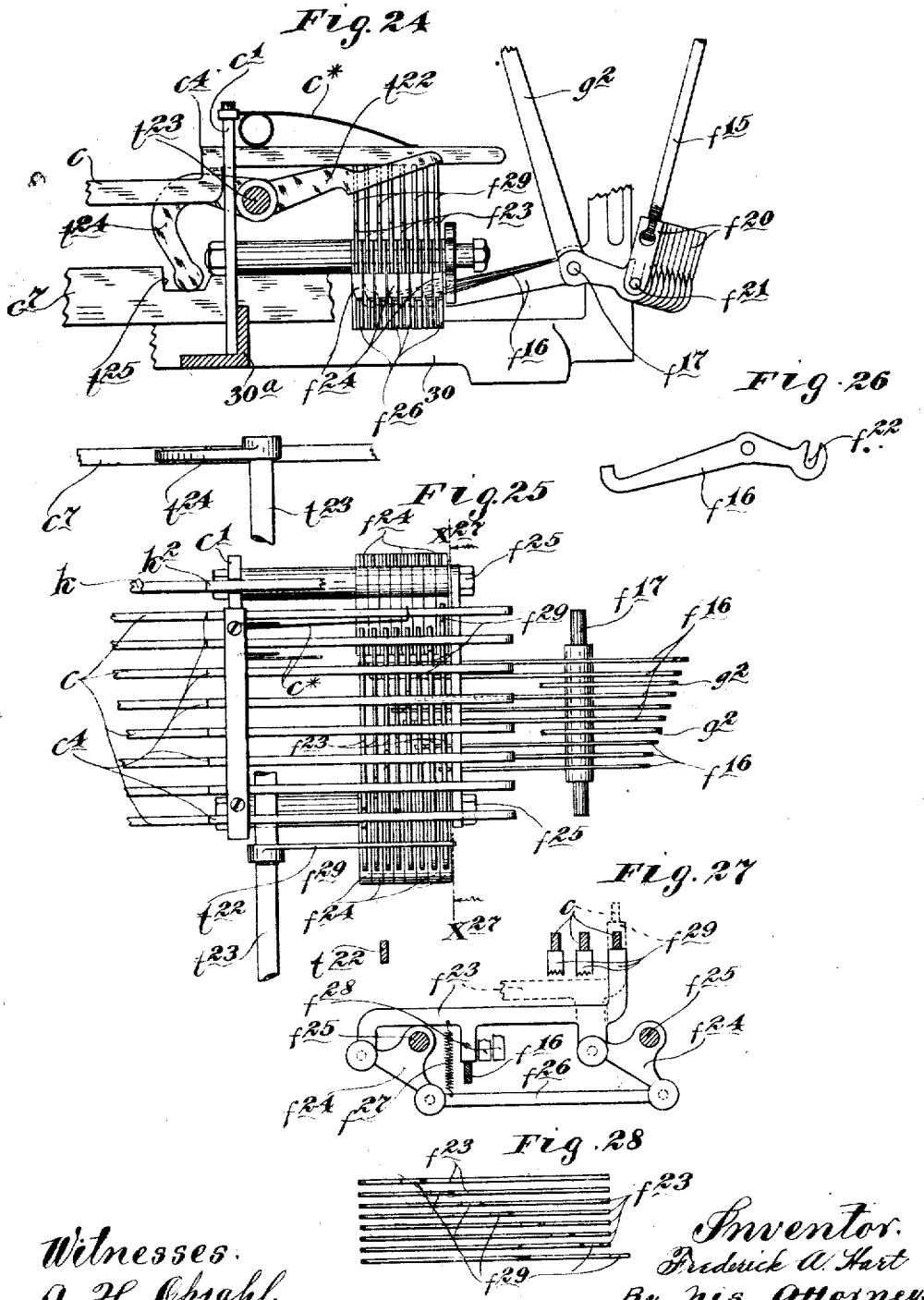

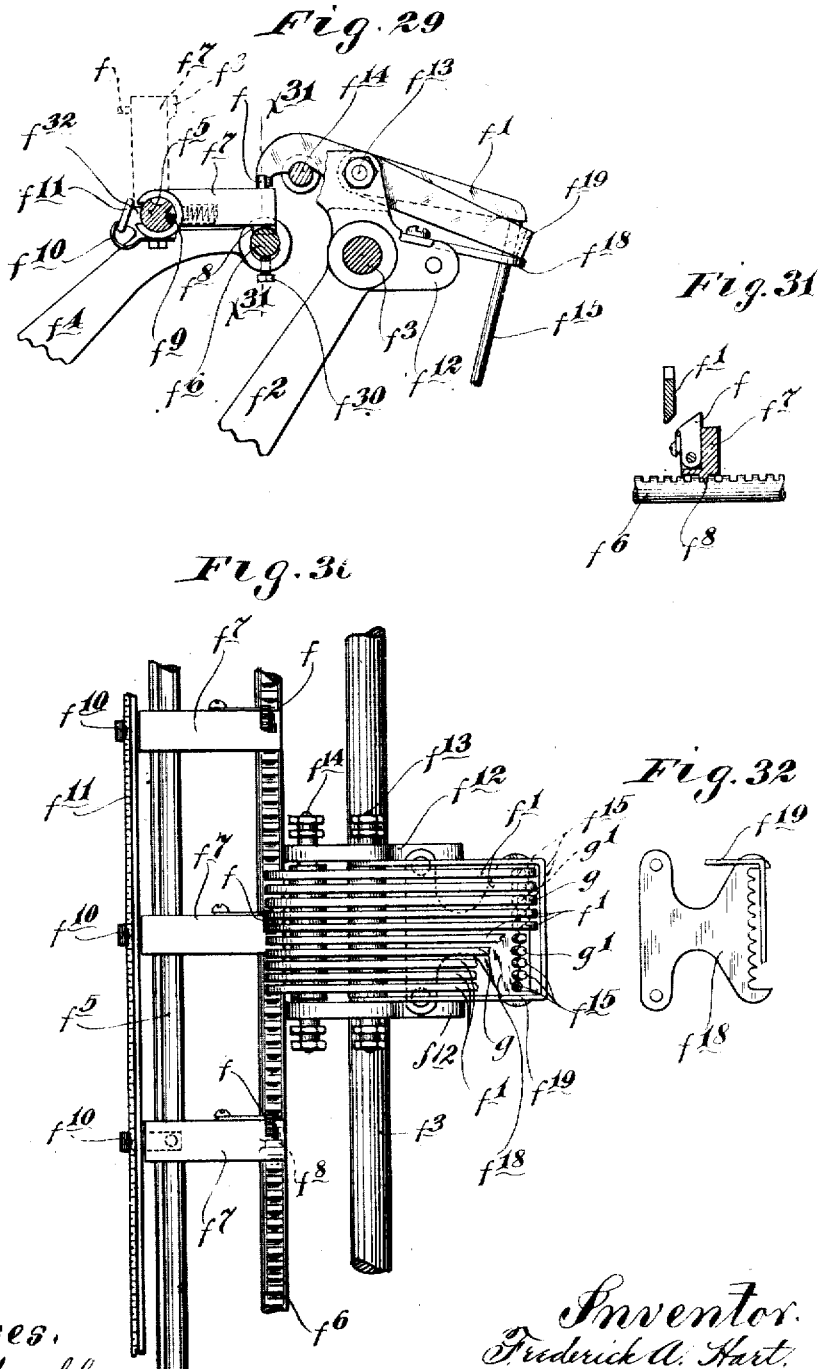

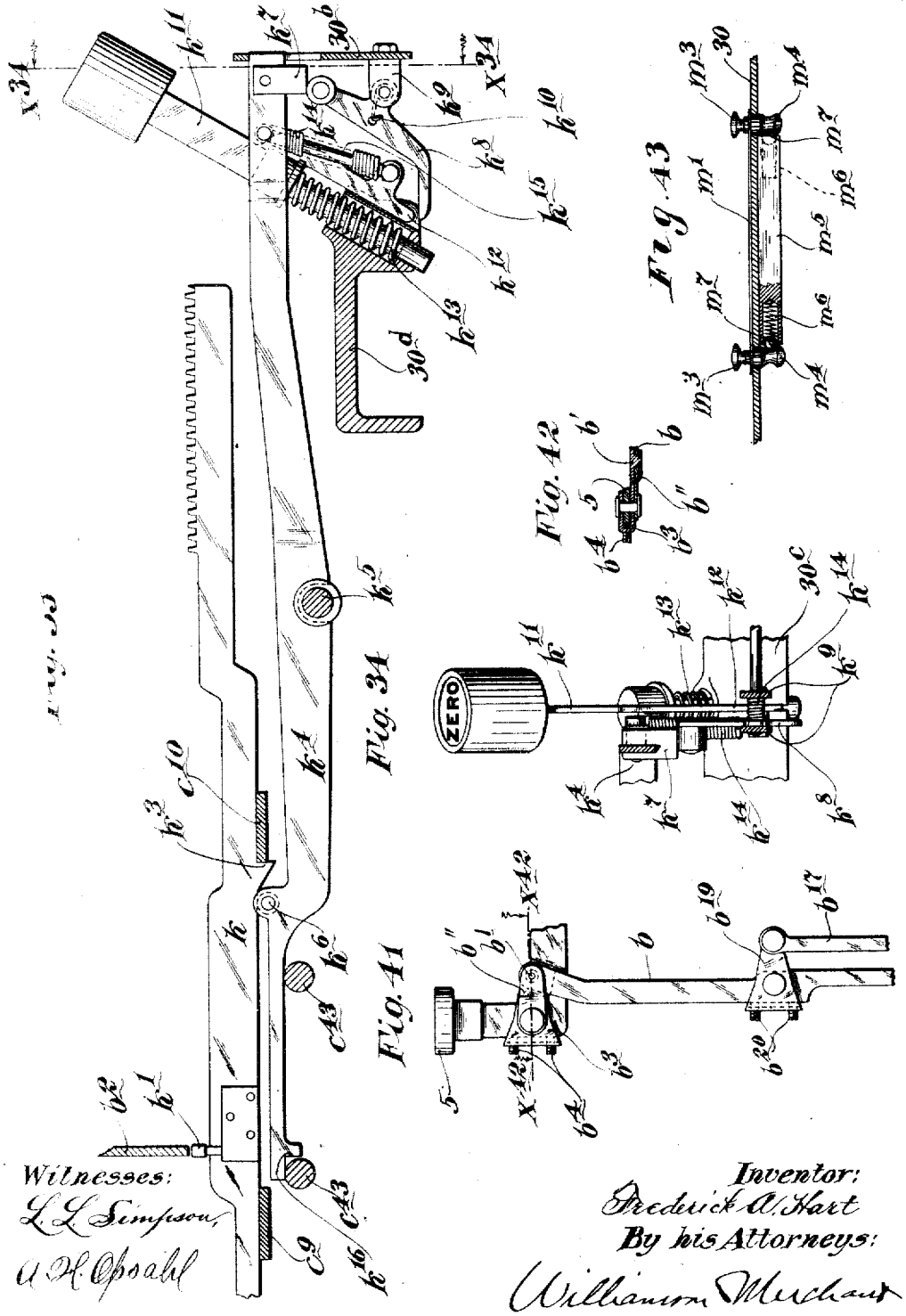

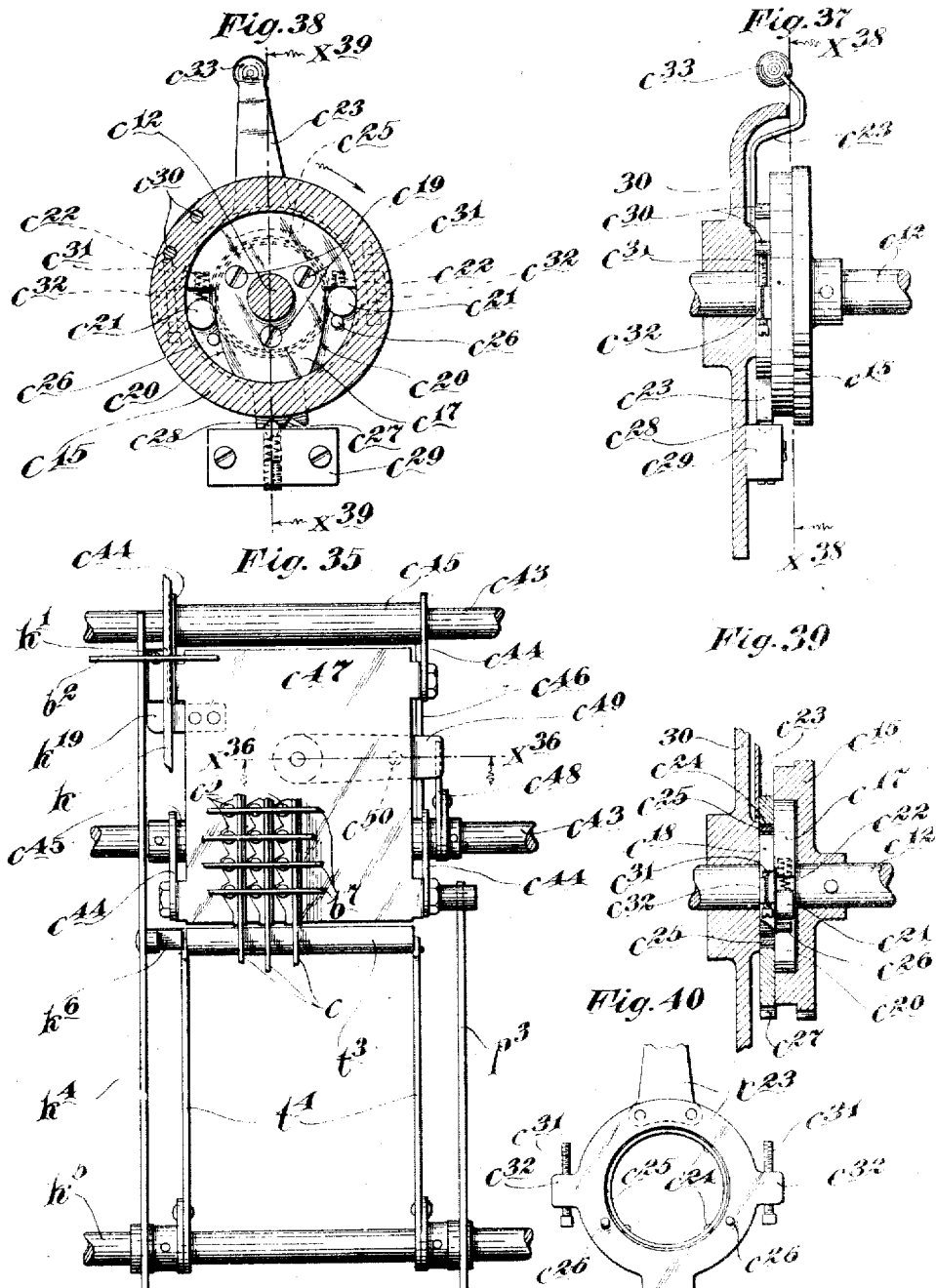

UNITED STATES PATENT OFFICE.

FREDERICK A. HART, OF HARTFORD, CONNECTICUT, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,270,411.  Specification of Letters Patent.   Patented June 25, 1918.

Application filed December 10, 1908.  Serial No. 466,836.

*To all whom it may concern:*

Be it known that I, FREDERICK A. HART, a citizen of the United States, residing at Hartford, in the county of Hartford and State of Connecticut, have invented certain new and useful Improvements in Combined Type-Writing and Computing Machines; and I do hereby declare the following to be a full, clear, and exact description of the invention, such as will enable others skilled in the art to which it appertains to make and use the same.

My invention relates to computing machines and to combined typewriting and computing machines, and broadly stated, has for its object to improve the construction and operation of machines of this general character.

To the above ends, the invention consists of the novel devices and combinations of devices hereinafter described and defined in the claims.

This invention is especially designed as an improvement on, or as a refinement of, combined typewriting and computing machines of the type disclosed in Letters Patent of the United States, issued to Hans Hanson, No. 816,319, of date March 27th, 1906; and No. 905,421, of date December 1st, 1908.

My improved typewriting and computing machine is illustrated in the accompanying drawings, wherein like characters refer to like parts throughout the several views.

In the drawings:

Figure 1 is a plan view showing the complete typewriting and computing machine.

Fig. 2 is a rear elevation of the complete typewriting and computing machine with some parts broken away.

Fig. 3 is a side elevation showing the complete typewriting and computing machine, some parts being broken away, and some parts being sectioned.

Fig. 4 is a skeleton view partly in side elevation, and partly in vertical section, and with some parts broken away, showing the shift key mechanism of the typewriter, and illustrating the relation thereof to parts of the so-called decimal order selecting mechanism.

Figs. 5, 6 and 7 are details in rear elevation, showing parts of the decimal order selecting mechanism and of the punctuation-space key-locking mechanism, and illustrating the different adjustments of the latter.

Fig. 8 is a horizontal section through the computer case, on the line $x^8$ $x^8$ of Fig. 3, the typewriter and certain other parts being removed from working position.

Fig. 9 is a vertical section taken approximately on the line $x^9$ $x^9$ of Fig. 8, with the typewriter removed, and with some parts of the computing mechanism broken away.

Fig. 10 is a vertical section taken approximately on the line $x^{10}$ $x^{10}$ of Fig. 8, with the typewriter and certain other parts removed.

Fig. 11 is a fragmentary view in vertical section taken from front toward the rear of the machine, approximately through the central portion thereof, and illustrating the action of the so-called register bar intercepting stop.

Fig. 12 is a vertical section taken approximately on the line $x^{12}$ $x^{12}$ of Fig. 8, with the typewriter and certain other parts removed.

Fig. 13 is a detail view in plan, with some parts broken away and some parts removed, showing the so-called unit bars and associated parts.

Fig. 14 is a front elevation of the parts shown in Fig. 13, showing also, underlying register bars, unit pins, and certain other parts, said unit bars being sectioned.

Fig. 15 is a detail in transverse vertical section taken on the line $x^{15}$ $x^{15}$ of Fig. 14.

Fig. 16 is a transverse vertical section taken on the irregular line $x^{16}$ $x^{16}$ of Fig. 14.

Fig. 17 is a detail view partly in side elevation and partly in section, showing a clutch device which constitutes part of the zero mechanism, for resetting the register wheels at zero.

Fig. 18 is a plan view showing the so-called zero bar, part thereof being broken away.

Fig. 19 is a side elevation of said zero bar and shows also several of the unit bars and a coöperating portion of the unit bar frame, in section.

Fig. 20 is a plan view showing one of the register bars and its unit pins.

Fig. 21 is a side elevation of the said register bar, and shows also in section, several of the overlying unit bars and a portion of the unit bar frame.

Fig. 22 is an enlarged detail, partly in plan and partly in horizontal section, illustrating the manner in which the unit pins are mounted on the register bars.

Fig. 23 is a section taken approximately on the line $x^{23} x^{23}$ of Fig. 22.

Fig. 24 is a detail in vertical section taken approximately on the line $x^{24} x^{24}$ of Fig. 8, some parts being broken away.

Fig. 25 is a plan view of parts shown in Fig. 24, some parts being broken away, and some parts being removed.

Fig. 26 is a detail showing in side elevation, one of the lower selecting levers of the decimal order selecting mechanism, a plurality of which are shown in Figs. 24 and 25, and elsewhere.

Fig. 27 is a transverse vertical section viewed from the rear, taken approximately on the line $x^{27} x^{27}$ of Fig. 25, some parts being removed.

Fig. 28 is a plan view of the so-called transposing bars shown in Figs. 24 and 25, all other parts being removed.

Fig. 29 is a detail in vertical section taken on the line $x^{29} x^{29}$ of Fig. 1.

Fig. 30 is a plan view of the parts shown in Fig. 29, some parts being broken away.

Fig. 31 is a section taken on the line $x^{31} x^{31}$ of Fig. 29.

Fig. 32 is a detail with parts broken away, showing a guide for the upper ends of the lever connecting rods of the decimal order selecting mechanism, and of the punctuation-space key-locking mechanism.

Fig. 33 is a detail view taken in section on the line $x^{33} x^{33}$ of Fig. 8, showing the zero key and zero bar and coöperating connections.

Fig. 34 is a transverse section taken on the line $x^{34} x^{34}$ of Fig. 33.

Fig. 35 is a detail view showing, in plan, portions of the unit pin restoring device, of the unit bars, the register bars, unit pins, the zero bar, the register bar intercepting stop, and certain other parts.

Fig. 36 is a detail in section taken on the line $x^{36} x^{36}$ of Fig. 35.

Fig. 37 is a detail view chiefly in rear elevation with some parts sectioned, showing a full stroke device for the operating lever and operating carriage.

Fig. 38 is a section taken on the line $x^{38} x^{38}$ of Fig. 37.

Fig. 39 is a section taken on the line $x^{39} x^{39}$ of Fig. 38, some parts being broken away.

Fig. 40 is a detail of the side elevation, showing the reversing lever of the said full stroke device, some parts being broken away.

Fig. 41 is a detail view in side elevation, showing a portion of one of the numeral keys, and particularly illustrating the means for adjustably connecting the so-called push bars to the respective numeral keys, and depending stems to said push bars.

Fig. 42 is a section taken on the line $x^{42} x^{42}$ of Fig. 41; and

Fig. 43 is a section taken approximately on the line $x^{43} x^{43}$ of Fig. 1.

In the detailed description, the following classification of mechanism and of reference notations appropriated thereto, are made, to-wit:—

The parts of the typewriter and of the computer case, designated by numerals.

Register proper, designated by $a$ and its powers.

The unit bars, their connections to numeral keys of typewriter, and associated parts, designated by $b$ and its powers.

Decimal order register bars, unit pins or preliminary representation devices, operating carriage and associated parts, including variable throw and full stroke devices, designated by $c$ and its powers.

Decimal order selecting mechanism, designated by $f$ and its powers.

Punctuation-space key-locking mechanism, designated by $g$ and its powers.

Zero device, designated by $k$ and its powers.

Error correcting devices, designated by $p$ and its powers.

Additional safety devices, including carriage operated numeral-key lock; register bar intercepting stop; register bar safety lock, operated by error correcting key and by operating carriage; and carriage operated transposing bar depressing device, indicated by $t$ and its powers.

*Typewriter and computer case.*

The typewriter illustrated is a No. 5 Underwood, the construction and operation of which, is well understood. Hence, for the purposes of this case, parts of this typewriter will be identified only to an extent which will make clear the relation of the typewriting mechanism to the computing mechanism.

Directing attention particularly to Figs. 1, 2 and 3, the numeral 1 represents the typewriter frame, the numeral 2 the typewriter carriage, the numeral 3 the type bars, the numeral 4 the character keys, the numeral 5 the numeral keys, the numeral 6 the shift keys, and the numeral 7 the spacing bail or space bar. All of these keys, are, of course, spring held in their uppermost or normal positions.

The typewriter carriage 2, see particularly Fig. 4, has a vertically movable supplemental frame $2^a$, that is held for parallel movements by arms 8 connected to a rock shaft 9, mounted in suitable bearings on the carriage 2, and it has the customary wheel 10 that runs upon a guide rod 11, connected for parallel movements by a pair of bell crank levers 12 secured to a rock shaft 13, which in turn, is journaled in suitable bearings on the sides of the typewriter frame 1, all as best shown in Figs. 3 and 4. The paper supporting roller or platen 14, is, of course, carried by the supplemental frame 2ª.

The upwardly extended rear ends of the shift keys 6, engage the backs of the bell crank levers 12, so that when either one of the shift keys is depressed, rod 11 will be raised, thereby lifting up the supplemental frame 2ª with its roller or platen 14, so as to thereby present the printing surface of the paper on the roller, to the upper case letters of the type bars.

In the normal position of the parts, best shown in Fig. 4, a lock pin 15 on the lower end of one of the bell crank levers 12, engages the rear extremity of a cam slot 16 formed in the rear end of a downwardly spring pressed shift lock lever 17, intermediately pivoted on a fixed rod 18 and subject, at its forward end, to a cam acting rocker 19, the upper end of which in turn, is subject to the action of a cam pin or projection 20 on one of the shift keys 6. By this means, the supplemental section 2ª of the typewriter carriage, while always free for common traveling movements with the main section 2 of the said typewriter carriage, is nevertheless, normally locked against rising movement, by the engagement of the said pin 15 with the upwardly extended rear extremity of the said slot 16. This locking feature has an important relation to the decimal order selecting mechanism, hereinafter described.

The numeral 21 indicates a spring held line feed lever which is connected to the platen or roller 14 in the customary way, through a pawl and ratchet device, so that when the said lever is moved toward the right, the roller and paper will be moved one step, as required for the line feed. The typewriter cariage is under spring tension from a suitable motor spring, not shown, and moves from right toward the left, with a step by step motion, under the control of a suitable escapement that is subject to the key action. Of the parts of this escapement, only the rack 22 is shown in Fig. 2.

On the front of the upper portion of the typewriter frame 1, is a long transversely extended scale 23, with which a pointer 24 on the typewriter carriage 2, coöperates, to indicate a transverse location on the paper, where characters will be printed, in any position of the typewriter carriage. The numeral 25 indicates stops adjustably secured on a transverse rod, (not shown), which in turn, is rigidly secured to the typewriter frame 1 at the upper front portion thereof, to-wit, immediately below the scale 23. These stops 25 serve to variably limit the extreme travel of the typewriter carriage.

The numeral 26 indicates upwardly spring pressed tabulating keys, (see Figs. 1 and 3), which operate in the usual way to release the typewriting carriage, for tabulating purposes; and the numerals 35, 36 and 37, (see Fig. 2), indicate respectively, the adjustable tabulating stops, the notched stop supporting bar, and the coöperating scale of the tabulating mechanism. The usual key actuated intercepting bars (not shown), coöperate with the tabulating stops 35, to intercept the movements of the typewriter carriage, in the tabulating action.

All parts of the typewriter so far described, are found in the No. 5 Underwood equipped with tabulating mechanism, which as above stated, is the typewriting machine illustrated in the drawings.

For the purpose of this case, it is only necessary to state, that the depression of any tabulating key will depress also one of the shift keys 6, (as shown, the right hand shift key), while the depression of the said shift key will not depress any of the said tabulating keys; and that this is accomplished by means of an upwardly spring pressed bail 27, pivotally connected to the typewriter frame 1, with its transverse free portion underlying all of the said tabulating keys 26; and by a link 28, pivotally connected to an extension 6ª of the said right hand shift key 6, and having a slot that is engaged by the head of the stud 29 on one side of the said bail 27, as best shown in Fig. 3.

The Underwood typewriter No. 5 is provided with an automatic speed governing mechanism, for controlling the speed of the typewriter carriage when the latter is released from its step by step controlling escapement. Of the parts of this speed governor, in so far as they are shown in Fig. 2, the numeral 31 indicates a bevel gear rigidly attached to the spring barrel 32 that incases the main spring (not shown) which propels the carriage in its operative movement. The numeral 33 indicates a pinion meshing with the bevel gear 31 and secured on a short shaft, having its bearings in the cylindrical casing 34 that contains the speed regulating mechanism proper. This cylindrical casing is pivotally mounted on the typewriter frame, and normally it is swung away from the bevel gear 31 so that the pinion 33 is out of mesh with said bevel gear during the ordinary movements of the typewriter carriage.

The tabulating keys 26 through connection (not shown), operate, when any one thereof is depressed, to move the casing 34 on its pivot, and thereby cause the pinion 33 to mesh with the gear 31; and in this way, the speed governing mechanism is thrown into action whenever a tabulating key is depressed, and the typewriter carriage is disconnected from its step by step escapement mechanism.

The computer case upon which the typewriter frame is detachably mounted, and within or upon which, most of the parts of the computing mechanism are directly or indirectly mounted, is indicated by the numeral 30, and as shown, it is of rectangular box-like form, and is provided with various bearings and shafts and other parts which will be particularly noted in connection with other groups of mechanisms.

The register.

For the purpose of independently listing and adding numbers in several columns, on a sheet of paper, the machine herein illustrated, is provided with several registers having corresponding independently operating decimal order selecting mechanisms, and corresponding preliminary representation devices, including register bars, and unit pins mounted thereon.

My invention is not in the field of register construction *per se*. Each register may comprise a group of decimal order digit-bearing wheels $a$, all as shown, mounted on a cross shaft $a^1$, supported by bearing brackets rising from the bottom of the computer case 30. On their hubs, the register wheels $a$ have loosely mounted gears $a^2$, connected therewith through ratchet and one-way ball clutches, not shown, and these, as will hereinafter appear, mesh with the teeth of underlying register bars, and are subject to the action of the latter, when the so-called operating carriage of the computer is moved forward. The register wheels are held against accidental movements by spring held levers $a^6$, mounted on a transverse rod $a^7$. On a parallel cross shaft $a^8$, are mounted certain wheels constituting parts of the tens-carrying mechanism, two of these only appearing in the drawings, to-wit, the six-toothed wheel $a^9$ and the three-toothed wheel $a^{10}$. On another cross shaft $a^{14}$, are mounted a series of gear segments or toothed arms $a^{15}$, which coöperate with the parts on the shaft $a^8$, in the tens-carrying action.

The tens-carrying shaft $a^{14}$ has a pinion $a^{16}$ connected therewith by a one way clutch device, not shown, but which may be identical with that shown in Fig. 17; and this pinion $a^{16}$ meshes with an intermediate gear $a^{17}$ journaled on one side of the case 30, and meshing with the left hand rack bar $c^7$ of the operating carriage hereinafter described, as best shown in Fig. 12.

The counting wheels $a$ may be simultaneously operated or moved different distances by the coöperating register bars, under the forward action of the computer carriage, and thereby, the tens-carrying devices will be so set that the tens will be carried forward, from one denomination to the other, in the regular order of the decimal scale, or from right toward the left, under the return movement of the computer operating carriage.

Unit bars, and their connections to numeral keys of typewriter.

Directing attention particularly to Figs. 3, 8, 9, 13 and 14, it will be seen that the numeral keys 5 are provided with depending push bars $b$, that work through slots $b^1$ in the forwardly projecting flange of a transversely extended elongated rectangular frame $b^2$, supported from the computer case 30. Preferably, the unit bar frame $b^2$ is detachably mounted on the computer case 30, see Figs. 10 and 14, and hence, the ends of the transverse bars of said frame are notched at $2^b$ for engagement with the depressed ends of supporting strips $2^c$ rigidly secured on the sides of the said case 30.

To make bars $b$ adjustable and removable, they are pivoted on studs $b'$ of coupling brackets $b^3$ that are intermediately pivoted on the numeral keys 5, and are adjustably locked thereto by opposing set screws $b^4$; and said brackets are provided with laterally movable retaining springs $b''$, that hold said bars from accidental uncoupling, as best shown in Figs. 41 and 42.

In the frame $b^2$ are journaled a series of nine rock shafts $b^5$, spring held in their normal positions, and extending in a direction from front toward the rear of the computer case. At their forwardly projecting ends, each underlying the lower end of one of the push bars $b$, the said rock shafts are provided with arms $b^6$ that are adapted to be engaged by the said corresponding push bars, when the corresponding numeral keys 5 are depressed.

Mounted for vertical movements in frame $b^2$, are nine so-called unit bars $b^7$, that are parallel to each other, and extend at right angles to the rock shafts $b^5$, or in other words, that extend transversely of the computer case 30 and of the underlying register bars, presently to be described. As shown in Fig. 14, the ends of unit bars $b^7$ work in grooves $b^8$ cut in the lower transverse end bars of the frame $b^2$, and are thereby held against lateral movements. Each unit bar $b^7$ is coupled to a corresponding overlying tie bar $b^9$, by a pair of bell cranks $b^{10}$, which are loosely mounted on transverse rods $b^{11}$ secured to the sides of the frame $b^2$.

Each rock shaft $b^5$ has a short arm $b^{12}$, shown as provided with a slotted end that engages a stud or projection $b^{13}$ on the corresponding tie bar $b^9$, see Fig. 14. These arms $b^{12}$, see Fig. 13, are arranged on an oblique line, so that the numeral keys from lower to higher orders, or in a direction from left toward the right, are coupled to, or operative on, the series of unit bars located successively from the front toward the rear of the machine, this being done for an important purpose which will appear when considering the arrangement of the unit pins or preliminary representation devices, on the register bars.

As shown in Fig. 14, $b^{14}$ indicates coiled springs, which yieldingly pull the unit bars $b^7$ upward, and normally hold the same and the coöperating bell cranks $b^{10}$, tie bars $b^9$, rock shafts $b^5$, and rock shaft arms $b^6$ and $b^{12}$, in the positions best shown in said Fig. 14.

With the construction described, it is evident, that the depression of one of the numeral keys will result in the depression of the corresponding unit bar $b^7$. It will also be noted, particularly by reference to Fig. 14, that a very considerable portion of the downward movement of the depressed numeral key, is required to bring the connected push bar $b$ into engagement with the corresponding rock shaft arm $b^6$; and in this connection, it may be also noted, that the upper arms of the bell cranks $b^{10}$ are very short as compared with the lower arms thereof, so that a very small portion of the final downward movement of a numeral key is required to effect a considerable downward movement of the corresponding unit bar. The especial object of this construction, is to provide for very light "touch" and rapid successive movements of the numeral keys, by depending very largely upon the momentum of the type bars to operate the unit bars $b^7$.

For coöperation with other parts, to lock the numeral keys 5 in normal or inoperative positions under several different operations, a series of rockers or cam blocks $b^{15}$ is provided, and these so-called rockers, as shown, are pivotally connected to the vertical front plate or side of the frame $b^2$, and are arranged to work between a pair of stops $b^{16}$ on the said frame plate. As shown in Figs. 13 and 14, there is but little play or space between said rockers $b^{15}$ and the stops $b^{16}$.

For coöperation with the said rockers $b^{15}$, to prevent the operation of more than one numeral key at a time, that is, to lock all other numeral keys in their normal positions, or in positions in which they cannot be made to operate either the printing or computing mechanisms when any one of the numeral keys is operatively depressed, each of said numeral keys is provided with a depending lock stem that is arranged to be forced downward between the underlying two adjacent rockers, and thereby take up all play between the rockers and stops $b^{16}$. These lock stems $b^{17}$ are preferably individual members that work through slots $b^{18}$ in the forwardly projecting flange of the frame $b^2$, and at their upper ends, see Figs. 3 and 41, are pivotally connected to coupling branches $b^{19}$ intermediately pivoted to the intermediate portions of the respective bars $b$, and adjustably secured thereto by opposing set screws $b^{20}$. The adjustable coupling brackets $b^8$ and $b^{19}$ permit of very accurate adjustment of the bars $b$ and stems $b^{17}$, in respect to the coöperating rock shaft arms $b^6$ and rockers $b^{15}$, so that the precise relative times of action thereof may be properly regulated. By reference to Fig. 14, it will be noted that the lower ends of the stems $b^{17}$ will be engaged with the coöperating rockers $b^{15}$, before the corresponding bars $b$ will be engaged with the coöperating rock shaft arms $b^6$.

It may be further added, that the play between the rockers $b^{15}$ and stops $b^{16}$, is only sufficient to allow one of the lock stems $b^{17}$ to be forced downward between the said rockers, at any one time.

*Decimal order register bars, unit pins or preliminary representation devices, operating carriage and associated parts, including variable throw and full stroke devices.*

Attention is particularly called to Figs. 8, 9, 20, 21, 22 and 23. For each register, comprising as shown, nine digit bearing wheels, there is a series of eight so-called register bars, to-wit, one for each register wheel, except the register wheel of highest order, which latter is at the extreme left in respect to Fig. 8. These register bars $c$ extend from front toward the rear of the machine, below the unit bars $b^7$, and hence at a right angle to the latter, and are independently movable. At their forward ends, the register bars $c$ have toothed rack portions that mesh with the gears $a^2$ of the respective register wheels $a$. At their rear ends, the said register bars are guided for longitudinal movements and are permitted limited vertical movements, by a guide comb or slotted plate $c^1$, that is rigidly secured, as shown, to a transverse bottom bar $30^a$ of the computer case 30. The rear ends of these register bars are yieldingly held down by light springs $c^3$, shown on Fig. 24. At their forward ends, said register bars $c$ slide over and are capable of a slight rocking action on a fulcrum rod $c^2$, supported by the register bearing brackets $30^c$, and preferably notched so as to hold the forward ends of said register bars properly spaced.

Each register bar, at its intermediate portion, is provided with a depending lug $c^3$, and just forward of the guide comb $c^1$, each register bar is formed with the shoulder $c^4$, the purposes of which will appear later on.

Each register bar $c$ carries a series of nine vertically movable unit pins $c^5$, preferably mounted in thickened central portions of said bars and yieldingly held by spring pressed balls $c^6$, best shown in Fig. 22.

When the register bars $c$ stand in their normal positions, their unit pins $c^5$, stand directly under the respective unit bars $b^7$, as best shown in Figs. 9, 16 and 20, but lie far enough below the same, so that the depression of the said unit bars will not engage the respective unit pins, unless the rear portion of a register bar is raised by the decimal order selecting mechanism, in which case, however, the depression of any unit bar will force downward into "set" position, the corresponding unit pin of such raised bar. The computer operating carriage or general operator, shown as made up of a pair of laterally spaced rack bars $c^7$, side plates $c^8$ rigidly secured to said rack bars $c^7$, and a pair of transverse tie bars $c^9$ and $c^{10}$, is mounted to move within the computer case 30, in the direction from front toward the rear thereof, see particularly Figs. 8, 9, 10, 11 and 12. The rack bars $c^7$, as shown, are arranged to move through suitable guide bearings $c^{11}$ on the sides of the case 30, as best shown in Fig. 12. The carriage bar $c^9$, hereinafter designated as a push bar, normally stands a little rearward of the rearmost line of unit pins $c^5$, with its forward edge at such elevation that when the operating carriage is moved forward, it will pass under the lower ends of such of the unit pins as have not been forced downward or set, but will engage any and all unit pins of the several register bars, which have been pushed downward or set. As is evident, when the register bars are moved forward, into action on the register wheels, under the forward movement of the operating carriage, and by action of the push bar $c^9$ on the set unit pins, the register bars will be given differential movements, unless the unit pins of like value have been set on all of the register bars.

Under returning movement of the operating carriage, the bar $c^{10}$ thereof, engages the depending lugs $c^3$ of the forwardly moved register bars and returns said bars to their normal positions.

Mounted in suitable bearings on the sides of the computer case 30, and extending above the register bars $c$, is an operating shaft $c^{12}$, having at its right hand end, a rigidly secured operating lever $c^{13}$, see Figs. 1 and 8, and having inside of the case 30, segmental gears $c^{14}$ and $c^{15}$, the latter of which as shown in Fig. 10, is of disk like form. These segmental gears $c^{14}$ and $c^{15}$, see Figs. 8, 10 and 12, mesh with intermediate pinions $c^{16}$, which in turn mesh with the teeth of the carriage rack bars $c^7$, and are suitably journaled on the sides of the case 30. As is evident, with these connections, the operating carriage may be moved forward and rearward when desired, by oscillatory movements of the operating lever $c^{13}$. The extreme movements of the operative carriage are limited by set screws $c^{55}$, one seated in a lug $c^{56}$ of one of the rack bars $c^7$, and engageable with a fixed part $c^{57}$ of the case 30, and the other seated in the front end of one of the front guides $c^{11}$, and engageable with the front end of said rack bar, see Fig. 10.

As a means for insuring full strokes of the operating lever $c^{13}$ and full or complete movements of the operating carriage, I provide an automatically reversible clutch device, the construction of which I believe to be broadly new. The preferred construction of this full stroke device is illustrated in Figs. 8, 37, 38, 39 and 40. In the application thereof to this machine, the disk like segmental gear $c^{15}$ on the operating shaft $c^{12}$, is recessed to receive and work rotatively on the outer portion $c^{17}$ of a hub $c^{18}$, which as shown, is rigidly secured, by screws $c^{19}$, to a thickened portion of the adjacent side of the case 30. The hub portion $c^{17}$, which is of greater diameter than the inner portion of the hub $c^{18}$, is cut away on both sides, to form reversely extended eccentric cam surfaces $c^{20}$, between which and the inner cylindrical surface of the gear $c^{15}$, reversely acting clutch rollers $c^{21}$ are arranged to work. Small coiled springs $c^{22}$, held in seats in the hub flange $c^{17}$, tend to force the respective rollers $c^{21}$ into operative positions, to-wit, into engagement with the converging surfaces of the gear $c^{15}$ and of the cam $c^{20}$. A so-called clutch reversing lever $c^{23}$ is pivotally mounted on the reduced body portion of the hub $c^{18}$, and anti-friction bearing balls $c^{24}$, shown as spaced by a ring $c^{25}$, are preferably interposed between the said hub $c^{18}$ and the ring like hub of said lever $c^{23}$. The ring like hub of said lever $c^{23}$ carries laterally projecting pins $c^{26}$, that are adapted to be engaged, one with each of the rollers $c^{21}$. In its lower end, the lever $c^{23}$ is provided with two notches $c^{27}$, with which a spring pressed ball $c^{28}$, mounted in a bearing $c^{29}$ on the side of the case 30, is adapted to be engaged to yieldingly hold said lever in either of two positions. The gear $c^{15}$ is shown as provided with two laterally projecting pins $c^{30}$, that are adapted to engage stop screws $c^{31}$ seated in lugs $c^{32}$ on the opposite sides of said reversing lever $c^{23}$. At its upper end, said lever $c^{23}$ is shown as provided with a finger piece $c^{33}$, by means of which, said lever may, when desired, be moved by hand.

When the lever $c^{23}$ is set in the position shown in Fig. 38, the right hand clutch roller $c^{21}$ is forced, against the tension of its spring, into an inoperative position, while the left hand clutch roller $c^{21}$ is rendered operative, by its spring, so that the gear $c^{15}$ may be freely rotated in the direction of the arrow marked on Fig. 38, but cannot be moved in a reverse direction, until it has made its complete or full oscillatory movement in the direction stated. At the limit of the movement of the said gear $c^{15}$ in the direction stated, the right hand pin $c^{30}$ engages the right hand set screw $c^{31}$, and thereby, forces the lever $c^{23}$ into its other position, in which position the left hand clutch roller $c^{21}$, by engagement therewith of left hand pin $c^{26}$, will be forced into an inoperative position, and the right hand clutch roller $c^{21}$ will be released, and hence, thrown into operative position, by its spring $c^{22}$. By this automatic reversing action, full and complete movements of the operating lever $c^{13}$, are required or made necessary, and the said lever, and hence, the operating carriage, cannot possibly be moved part way in one direction and then back again, unless the reversing lever $c^{23}$ be intentionally reversed by hand, which will, of course, be a very unusual operation, and not a part of the ordinary action of the machine.

As an adjustable means for imparting variable return movements to the typewriter carriage, or in other words, for bringing the typewriter carriage to different desired normal positions toward the right, under constant predetermined movements of the operating lever and of the operating carriage of the computer, I provide a variable throw device, which in itself, I believe to be broadly new. This variable throw device is best shown in Figs. 1, 2, 3 and 8.

Describing this device, a flexible connection such as a tape $c^{34}$, is attached to the free end of the typewriter line feed lever 21, is passed over a guide sheave $c^{35}$ on an arm or lug $c^{36}$ of the typewriter frame, and is then passed downward, and secured to, and adapted to be wound upon a grooved slack take-up wheel $c^{37}$. This wheel $c^{37}$ is suitably mounted on the adjacent side of the computer frame 30, and carries a spur pinion $c^{38}$, that meshes with a spur gear $c^{39}$ that is loosely journaled on the operating shaft $c^{12}$ adjacent to the operating lever $c^{13}$. The said operating lever $c^{13}$ also carries a loose spur pinion $c^{40}$, that meshes with said gear $c^{39}$ and is adapted to be engaged with a similar spur pinion $c^{41}$, which latter also meshes with said gear $c^{39}$, and is loosely journaled in the outer extremity of a bifurcated supporting arm $c^{42}$, which as shown, straddles the said gear $c^{39}$ and is loosely journaled on the operating shaft $c^{12}$.

Preferably, the wheel $c^{37}$ is under tension from a light coiled spring, (not shown), but which tends to rotate the same in the direction of the arrow marked thereon in Fig. 3, so as to keep the tape $c^{34}$ free from slack. Preferably also, the supporting arm $c^{42}$ engages the pinion $c^{41}$, under sufficient friction to prevent the said arm from being accidentally moved from any set position on the gear $c^{39}$. However, the said arm $c^{42}$ may be easily moved so as to set the pinion $c^{41}$ in any desired position on the gear $c^{39}$, and hence, normally any desired distance from the pinion $c^{40}$ that is carried by the operating lever $c^{13}$.

As is evident, when the operating lever $c^{13}$ is moved forward from its normal position, shown in Fig. 3, the typewriter carriage will remain stationary in its position toward the left, in respect to Fig. 1, until the pinion $c^{40}$ runs into engagement with the pinion $c^{41}$, whereupon the two pinions, by their opposing action or tendency to rotate the gear $c^{39}$, will lock said gear to the operating lever $c^{13}$, so that the subsequent or continued forward movement of said operating lever, will positively rotate said gear $c^{39}$, the pinion $c^{38}$ and wheel $c^{37}$, and thereby return the typewriter carriage to a position at the right, that depends on the position in which the pinion $c^{41}$ is normally set in respect to the pinion $c^{40}$. Otherwise stated, the nearer said pinion $c^{41}$ is normally set to the pinion $c^{40}$, the farther toward the right will be the position to which the typewriter carriage will be returned, under a complete forward movement of the operating lever $c^{13}$ and of the operating carriage.

It is evident that the frictional engagement between the pinion $c^{41}$ and its supporting arm $c^{42}$ is not required to prevent movement of said pinion and arm in respect to the gear $c^{39}$, when the two pinions $c^{40}$ and $c^{41}$ are engaged, for it is well understood that two pinions or gears engaged with each other and with a third pinion or gear, will interlock, so that no one of the three can rotate in respect to the other.

Such unit pins $c^5$ as have been pressed downward or set in one operation, for operative action on the register, must of course, be restored to normal positions before starting a new line. This is accomplished by means, best shown in Figs. 9, 12, 14, 16, 35 and 36. A pair of rods $c^{43}$ are extended transversely of the case 30 below the register bars, and at their ends are mounted in the sides of said case. For each register and group of register bars, there are loosely journaled on the rods $c^{43}$, small bell cranks $c^{44}$ connected in pairs by sleeves $c^{45}$. The depending arms of the front and rear bell cranks are connected by links $c^{46}$, so that all the bell cranks are connected for common oscillatory movements. The upper arms of the four bell cranks are pivotally connected to depending lugs of a unit pin restoring platform $c^{47}$, that directly underlies all of the coöperating unit pins, when the register bars are in their normal positions, and which, when moved vertically, is held always in a true horizontal position by said bell cranks.

The front rod $c^{43}$ serves as a rock shaft, and is provided with a short arm $c^{48}$, that is adapted to engage a projecting arm $c^{49}$ of the platform $c^{47}$. This arm $c^{49}$, as shown in Figs. 35 and 36, is riveted at its inner end to the central portion of the platform $c^{47}$, and its free end is made adjustable in respect thereto, by a set screw $c^{50}$. When the arm $c^{48}$ is moved upward into engagement with the arm $c^{49}$, it will raise the platform $c^{47}$, and the latter will restore to normal positions, all of the set unit pins; and to accomplish this, at the final part of the return movement of the operating carriage, and at a time when all the unit pins are directly over the said platform, the forward rod $c^{43}$, which serves as a rock shaft, is provided with a cam arm $c^{51}$ that is adapted to be engaged by a spring held cam acting dog $c^{52}$, which as shown in Fig. 12, is pivoted to the left hand rack bar $c^7$ of the operating carriage. To very accurately adjust the time of action of the said cam dog $c^{52}$ on the said cam arm $c^{51}$, it is shown as provided with an arm $c^{53}$ that is normally spring held against a clip $c^{54}$ on the said rack bar $c^7$.

As is evident, at the final part of the return movement of the operating carriage, the cam dog $c^{52}$, acting on the arm $c^{51}$, will raise the platform $c^{47}$, as above stated; while under initial forward movement, the said dog will simply turn backward and pass under the said arm $c^{51}$, without moving the latter.

The said platform $c^{47}$, as will be hereinafter noted, constitutes part of the so-called error correcting device, and also serves to restore into normal position, a single, so-called, zero pin carried by a sliding bar of the zero devices.

*Decimal order selecting mechanism.*

This decimal order selecting mechanism is shown in many of the views of the drawings, but attention is first particularly called to Figs. 1, 2, 3 and 29 to 32 inclusive.

For each register and coöperating set of register bars, there is a selecting dog $f$, sometimes designated as a decimal order selector, which is carried by the typewriter carriage, and there is also a group of, so-called, selecting levers or jacks $f^1$, equal in number to the number of coöperating register bars, and arranged to be engaged in succession by the said selecting dog, and operative through connections including so-called, transposing bars, to lift the register bars, in succession, from left toward the right, under movement of the typewriter carriage, from right toward the left.

Also in the group of selecting levers, there are other levers preferably of identically the same construction, designated by the letter $g$, to-wit, as shown, two in number, which constitute elements of the so-called punctuation-space key-locking mechanism. Hence, in each group of levers shown in the drawings, there are, as shown, ten levers.

In the application of this improved decimal order selecting mechanism, the typewriter frame 1 is provided, at its upper rear corners, with rearwardly and upwardly extended laterally spaced arms $f^2$, that rigidly support a transverse rod $f^3$; and in front of the arms $f^2$, a pair of laterally spaced upwardly and rearwardly extended arms $f^4$ (Figs. 4 and 29) are rigidly secured to the rock shaft 9, to which, it will be remembered, the vertically movable arms 8 of the vertically adjustable supplemental section $2^a$ of the typewriter carriage, are rigidly secured. These arms $f^4$ support a pair of transverse rods $f^5$ and $f^6$, the former of which has two longitudinally extended grooves, and the latter of which has longitudinally spaced notches that correspond in the distance of their spacing, to the escapement movement of the typewriter carriage.

The selecting dog $f$ is spring held in its normal position, and is pivotally mounted in the rearward projecting end of a supporting block or arm $f^7$, that is pivotally mounted on the rod $f^5$ and is capable of sliding adjustments thereon. At its free end, said block $f^x$ is provided with a depending tooth $f^8$, see Figs. 29 and 31, that engages a notch of the rod $f^6$, to lock said arm against sliding movements on the rod $f^5$. In a recess of said arm $f^7$, is a spring pressed ball $f^9$ that normally engages the lower groove of the rod $f^5$, and holds the said arm $f^7$ down, with the selecting dog $f$ thereof in position for action on the forward ends of the levers $f^1$ and $g$, under the step by step movement of the typewriter carriage from right toward the left. Under movement of the typewriter carriage from left toward the right, said selecting dog $f$ will move pivotally, and pass free under the forward ends of said levers $f^1$ and $g$. By reference to Fig. 31, it will be noted that the selecting dog $f$, at its upper end, is beveled so that it inclines in the direction of the operative movement of the typewriter carriage, and it will also be noted that the forward ends of the levers $f^1$ and $g$ are beveled in the same direction, for engagement therewith, so that the selecting dog will lift directly upward the engaged ends of said levers, under the operative movement of the typewriter carriage.

The supporting block $f^7$, when moved pivotally upward, so that its spring pressed ball $f^9$ engages the upper groove of the rod $f^5$, will be held in a position to clear the levers $f^1$ and $g$, and its selecting dog $f$, will then of course, be rendered inoperative. The supporting block $f^7$ is provided with a pointer $f^{10}$, that works over a scale bar $f^{11}$ attached at its ends to the arms $f^4$, and cooperates with the said scale, to indicate the transverse position of the sheet of printed matter.

To support each group of levers $f^1$ and $g$, a pair of laterally spaced bearing plates $f^{12}$ are rigidly secured to the fixed supporting rod $f^3$, and the upper portions of these plates $f^{12}$ are connected by two parallel rods $f^{13}$ and $f^{14}$, upon the former of which, the said levers $f^1$ and $g$ are intermediately pivoted. The rod $f^{14}$ acts as a stop to limit the downward movement of the forward ends of the levers $f^1$ and $g$, and it is preferably notched so as to assist in spacing the said levers, which levers are primarily spaced by suitable collars or washers on the rod $f^{13}$. The forward ends of the said levers $f^1$ and $g$ are spring pressed downward by means hereinafter noted. The rods $f^{13}$ and $f^{14}$ have slight longitudinal adjustments for the purpose of correctly locating the levers $f^1$ and $g$ with respect to the selecting dog $f$.

In the arrangement shown in Figs. 9, 25 and 30, for instance, the punctuation space levers $g$ are the fourth and eighth levers, counted from the right toward the left. These levers $f^1$ and $g$, at their rear ends, rest directly upon light push rods $f^{15}$ and $g^1$ respectively, and the lower ends of these rods are pivotally connected to rearwardly extended arms of lower selecting levers $f^{16}$ and bell crank levers $g^2$ respectively, which levers $f^{16}$ and $g^2$, are pivotally mounted on a short transverse rod $f^{17}$ rigidly supported by the rear portion of the computer case 30. These levers $f^{16}$ and $g^2$ correspond in their arrangement to the levers $f^1$ and $g$, that is, the bell cranks $g^2$ are the fourth and eighth members, counted from the right toward the left. The upper ends of the rods $f^{15}$ and $g^1$ are detachably supported by a notched guide plate $f^{18}$, secured to the bearing plates $f^{12}$, and by a coöperating bail $f^{19}$, the arms of which are pivoted on the rod $f^{13}$, as best shown in Figs. 29, 30, and 32. The lower ends of said rods $f^{15}$ and $g^1$ are adjustably and detachably connected to their respective levers $f^{16}$ and $g^2$, by means of coupling heads $f^{20}$. The upper ends of these coupling heads $f^{20}$ are shown as split, and provided with threaded seats into which the lower ends of said rods are screwed, and by which, the said rods are frictionally held against accidental rotation. The lower ends of said coupling heads are bifurcated so that they straddle the rear ends of said levers, and they are provided with pins $f^{21}$ that loosely rest in notches or open seats $f^{22}$ formed in the rear ends of the said levers $f^{16}$ and $g^2$.

By reference to particularly Figs. 24, 25 and 27, it will be noted, that the lower selecting levers $f^{16}$, in a direction from right toward the left, project successively farther and farther forward and at their rear ends, are correspondingly lengthened, so as to maintain, in each lever, the same relative length of front to rear end.

Extending transversely of the said levers $f^{16}$ and of the register bars $c$, overlying the former and underlying the rear end portions of the latter, is a series of eight parallel, so-called, transposing bars $f^{23}$. These transposing bars $f^{23}$ are supported for vertical parallel movements by pairs of bell cranks $f^{24}$ mounted on rods $f^{25}$ supported by the guide plate $c^1$. Preferably also the lower arms of the pairs of bell cranks $f^{24}$ are connected by links $f^{26}$. As shown in Fig. 27, the left hand bell cranks $f^{24}$ limit the downward movements of the respective transposing bars $f^{23}$. Each transposing bar $f^{23}$ is connected, by a coiled spring $f^{27}$, to its underlying link $f^{26}$, that serves to yieldingly hold the former downward or in its normal position. These springs $f^{27}$, afford the yielding means referred to above, for holding the respective selecting levers $f^1$ in their normal positions.

Each transposing bar $f^{23}$ has a depending lug $f^{28}$ and an upwardly extended lug $f^{29}$. The lugs $f^{28}$ directly overlie the upturned forward ends of the lower selecting levers $f^{16}$, and the lugs $f^{29}$ directly underlie the rear ends of the register bars $c$. More definitely stated, in the arrangement shown, the upturned end of the right hand selecting lever $f^{16}$ is arranged to engage the lug $f^{28}$ of the rearmost transposing bar $f^{23}$, and the lug $f^{29}$ of this rearmost transposing bar is arranged to engage and lift the left hand register bar $c$; and the left hand selecting lever $f^{16}$ is arranged to engage the lug $f^{28}$ of the most forward transposing bar $f^{23}$, and the lug $f^{29}$ of this forward transposing bar, is arranged to engage and lift the right hand register bar $c$. Stated still in another way, the said lugs $f^{28}$ are alined obliquely in one direction, and the lugs $f^{29}$ are alined obliquely in the other direction, and are so correlated to each other and to the selecting levers $f^{16}$ and register bars $c$, that the said register bars will be raised, under movement of the typewriter carriage from the right toward the left, in succession from the left toward the right, into position to present their unit pins to the action of a depressed unit bar. The rod $f^3$ is made vertically adjustable by opposing set screws $f^{30}$, one of which is shown in Fig. 29, seated in the ends of the arms $f^4$. At its left hand end, the rod $f^5$ is reduced at $f^{31}$, see Fig. 1, and the hubs of the blocks $f^7$ are provided with open notches $f^{32}$, see Fig. 29, so that the said blocks may be removed from said rod when moved to the left hand end of the latter.

As shown in Fig. 2, the rods $f^{15}$ and $g^1$ are normally covered by detachable sheet metal channel plates $f^{33}$.

*Punctuation-space key-locking devices.*

These devices have already been described in part, and further described, are as follows:

The long upwardly extended arms of the two bell cranks $g^2$ are pivotally connected to the rear ends of forwardly extended connecting links $g^3$, the front ends of which are attached, by slot and pin connections, $g^4$, to the free ends of upwardly extended arms $g^5$, rigidly secured to a rock shaft $g^6$, see Figs. 9, 13, 14 and 15, that is mounted in suitable bearings on the end portions of the unit bar frame $b^2$. This rock shaft $g^6$ has a forwardly curved lock arm $g^7$, the reduced free end $g^8$ of which, is adapted to be forced between two of the rockers $b^{15}$, but normally stands in an inoperative position below same, as best shown in Figs. 14 and 15. When the said end $g^8$ of the lock arm $g^7$ is forced between the said rockers $b^{15}$, all play between the rockers will be taken up, so that no one of the numeral keys can be depressed to an extent sufficient to cause the printing of a numeral in the punctuation space. A coiled spring $g^9$, shown in Fig. 15, yieldingly holds the lock arm $g^7$ and the two arms $g^5$ in their normal positions.

When the selecting dog $f$, under the operative movement of the typewriter carriage, engages and depresses one of the punctuation space levers $g$, it is evident that the connected bell crank $g^2$ and connecting link $g^3$ will be moved rearward, thereby rocking the shaft $g^6$ and throwing the lock arm $g^7$ into its numeral-key locking position just above noted. It is evident however, that the slot and pin connections $g^4$ will prevent the other connecting link $g^3$ from being forced rearward, at such time, or in other words, that either one of the said connecting links may be rendered operative to move the said rock arm $g^7$, without requiring movement of the other connecting link and its bell crank $g^2$.

*Zero devices.*

For this mechanism attention is particularly called to Figs. 8, 10, 17, 18, 19, 33, 34 and 38. At the left hand side of each series of register bars $c$, is a zero bar $k$ of the same construction as said register bars, mounted to slide in the same way, but provided with only a single vertically movable yieldingly held pin $k^1$, which is of the same construction as the unit pins, but performs a different function. This zero pin $k^1$, normally stands directly under the rearmost side bar of the unit bar frame $b^2$, see particularly Fig. 19. The zero bar, like the register bars, is capable of being raised at its rear end, by different means however, and it is provided with a shoulder $k^2$ and with a lug $k^3$, that corresponds respectively to the shoulder $c^4$ and lugs $c^3$ of said register bar.

Located below the zero bar $k$, is a long lever $k^4$, that is intermediately pivoted on a transverse shaft $k^5$ mounted on the case 30, and the rear end of which normally rests upon the rods $c^{43}$, as best shown in Fig. 33. This lever $k^4$ has a lateral projection $k^6$ that immediately underlies the intermediate portion of the zero bar $k$. At its front end, the lever $k^4$ works in a vertical slot of a front bar $30^b$, supported by the case 30, and is provided with a head $k^7$, that is normally engaged by the roller equipped upper end of a lock lever $k^8$, which as shown, is pivoted to a bearing $k^9$ on said bar $30^b$ and is subject to a spring $k^{10}$ that yieldingly holds said lever in its normal lever locking position, best shown in Fig. 33.

The zero key proper $k^{11}$, which is of the push key type, is shown as provided with a large head that works through the top plate of the case 30, at the front thereof, and is provided with a stem that slides through the bar $30^d$ of said case, and has a rigidly secured depending lock tripping finger $k^{12}$. The key $k^{11}$ is yieldingly pressed upward, by a coiled spring $k^{13}$, applied to the stem thereof and to the said bar $30^d$. A lever actuating coiled spring $k^{14}$ connects the front end of the lever $k^4$, to the said finger $k^{12}$. Inside of the spring $k^{14}$ is a loose rod $k^{15}$.

The operation of this improved key mechanism is as follows:

When the zero key $k^{11}$ is depressed, the first effect thereof, is to stretch the spring $k^{14}$, the lever $k^4$ being then held by the lock lever $k^8$ so that it temporarily affords a fixed base of reaction for the said spring; and then after the said spring $k^{14}$ has been put under tension, the projecting portion of the finger $k^{12}$ strikes the free lower end of the lock lever $k^8$, thereby rocking the same so as to release the lever $k^4$, whereupon the said spring $k^{14}$ imparts a quick upward movement to the rear end of the said lever $k^4$. This movement of said lever $k^4$, raises the rear end portion of the zero bar $k$, and sets the zero pin $k^1$, by thrusting the same upward against the overlying rear bar of the unit pin frame $b^2$, and it also positions the rear end $k^{16}$ of said lever in front of the so-called push bar $c^9$ of the operating carriage, so that said operating carriage cannot possibly be moved forward, from its rearmost or normal position, until after the zero key $k^{11}$ and said lever $k^4$, have been returned to normal positions, subsequent to the removal of the finger from the said zero key. When the zero pin $k^1$ is thus set, and the zero bar $k$ is subsequently dropped back into normal position, upon the release of the zero key, its lower end will stand in position, like the set unit pins, to be engaged by the push bar $c^9$, under forward movement of the operating carriage. The loose rod $k^{16}$ in the coiled spring $k^{14}$, causes the lever $k^4$ to be positively returned to normal position, when the key $k^{11}$ is restored to its normal position by the spring $k^{13}$.

The improved key mechanism above described, insures a full operative movement of the lever $k^4$, and hence, of the zero bar $k$, as is required to effect the proper setting of the zero pin, and furthermore, it produces a clicking action which will clearly indicate, to the operator, when such movement has taken place.

The teeth on the front end of the zero bar $k$, (see Figs. 9 and 17), mesh with a pinion $k^{17}$ that is loosely mounted on the coöperating register wheel shaft $o^1$, and is connected therewith by one way friction clutch $k^{18}$, that is arranged to cause rotation of said shaft $o^1$ under forward movement of the zero bar and of the operating carriage. This zero bar, unlike the register bars, is, when moved, always given a full movement both forward and rearward, by the operating carriage. As is obvious, the return or rearward movement of the zero bar is accomplished by engagement of the carriage bar $c^{10}$ with the lug $k^2$ thereof.

The so-called unit pin restoring platform, $c^{47}$, is provided with a laterally projecting portion $k^{19}$, see particularly Fig. 35, that normally underlies the zero pin $k^1$, so that the said zero pin, if set, will be restored to its normal position, whenever the said platform is raised.

It will, of course, be understood that after each column of figures has been added, on the register, an additional forward and return movement of the operating carriage is required, to render the zero bar operative on said register.

Error correcting device.

The key mechanism proper of this error correcting device is identical with that of the zero mechanism above described, and hence the parts thereof, may be briefly noted. The push key $p$ is spring pressed upward, by a coiled spring $p^1$, and is provided with a depending tripping finger $p^2$. A lever $p^3$ is intermediately pivoted on the shaft $k^5$, see Fig. 9, and at its forward end, is provided with a head $p^4$ that is normally engaged by a spring held lock lever $p^5$, the lower end of which is adapted to be engaged by the projection of the trip finger $p^2$, at the final part of the downward movement of the key $p$. A spring $p^6$ connects the finger $p^3$ to the front end of the lever $p^3$, and like the spring $k^{14}$, of the zero key mechanism, is adapted to be set under tension, by the initial downward movement of the key $p$, and to act upon the lever $p^3$, after the latter has been released by an engagement with the finger $p^2$ with the lock lever $p^5$.

The rearwardly projecting free end of the lever $p^3$ is adapted to engage a projecting pin $p^7$ of one of the forward platform supporting bell cranks $c^{44}$, so that when the said lever $p^3$ is rocked by the spring $p^6$, the platform $c^{47}$ will be raised into an operative position and thereby restore all set unit pins, and also the zero pin, if the latter happens to be set, to normal positions.

By this device, which is, of course, operative at will, unit pins incorrectly set, may, where the error is discovered before the operating carriage is moved forward to accumulate the amount on the register, be restored to normal positions, and the number again set up by the proper manipulation of the numeral keys. Of course, the incorrectly printed number on the printed sheet, should also be corrected.

There is one error correcting mechanism, such as above described, for each register. This improved error correcting device operates under uniform pressure, regardless of the number of unit pins to be restored to normal positions, and furthermore, is well adapted for use in machines having a plurality of registers.

*Safety devices, including carriage operated numeral key lock; register bar intercepting stop; register bar safety lock, operated by error correcting key and by operating carriage; and carriage operated transposing bar depressing device.*

Attention is first particularly directed to Figs. 9, 13, 14 and 16. On a sleeve $1^t$ that is supported by lugs of the frame $b^2$ and surrounds the rock shaft $g^6$, (which shaft as before noted, is mounted on the lower front portion of the unit bar frame $b^2$), is loosely pivoted, a depending forwardly spring pressed arm $t$, having an upwardly extended lock lug or finger $t^1$, the reduced upper end of which, will, by the arm actuating spring $t^2$, be forced upward between two of the rockers $b^{15}$, whenever the operating carriage is moved forward from its extreme rearmost or normal position, and thereby lock the numeral keys 5 so that no one thereof can be depressed. When the operating carriage is in its normal position, the carriage bar $c^{10}$ engages the lower end of said lever $t$ and holds the said lock lug $t^1$ in its lowermost or inoperative position, shown in Figs. 14 and 16.

The register bar intercepting stop, so-called, is best shown in Figs. 9, 10, 11 and 35. This device comprises a stop blade $t^3$ located below the register bars and secured to the arms $t^4$ of the rock shaft $k^5$, before described, see Fig. 8. This shaft $k^5$, it will be noted, projects less than from one side to the other of the case 30, so as to leave clearance for the sides of the operating carriage.

The shaft $k^5$ has a third arm $t^7$, see particularly Fig. 11, that rests upon a cam plate $t^8$ that is carried by the operating carriage, and is provided with upturned cam end $t^9$.

Normally, the stop blade $t^3$ stands in the position shown in Fig. 9, below the forward edge of the pin restoring platform $c^{47}$. The cam end $t^9$ is so related to the free end of the arm $t^7$, that it will engage the said arm and throw the stop blade $t^3$ upward, into its operative position shown in Fig. 11, just in time to catch or intercept all of the set unit pins that are engaged and forced forward, into a transversely alined position, by the carriage push bar $c^9$. The movement of said stop blade $t^3$ is so accurately adjusted, that if, by any incorrect action, two unit pins in a single register bar should happen to be set, as shown in Fig. 11, the advance set unit pins will pass over the said stop blade, and hence no damage will be done to the machine, and at the same time, the possibility of overmovement of the register bars, under the action of momentum, is eliminated. As is evident, when the operating carriage is returned to its normal position, the said intercepting stop blade $t^3$ will drop into its inoperative position, by the action of gravity.

The register bar safety device, which is best shown in Figs. 9, 10 and 12, comprises a transverse bar $t^{10}$ that is carried by laterally spaced arms $t^{11}$ of a transverse rock shaft $t^{12}$, mounted at its ends in the sides of the case 30, and provided with depending arms $t^{13}$ connected by a transverse rod $t^{14}$. The rod $t^{14}$ is normally engaged by the shoulder $t^{15}$ of a long tripping bar $t^{16}$, the rear end of which is arranged to slide through the transverse angle bar $30^a$ of the case 30, and the front end of which is pivotally connected to an arm $t^{17}$ of a rock shaft $t^{18}$, the ends of which are journaled in the sides of the case 30. A light coiled spring $t^{19}$, see Fig. 10, yieldingly draws the bar $t^{10}$ forward and holds the rod $t^{14}$ engaged with the shoulder $t^{15}$ of the tripping bar $t^{16}$. The rock shaft $t^{18}$ has forwardly projecting arms $t^{20}$ that are directly subject to the lower ends of the stems of the error correcting keys $p$, as best shown in Fig. 10. The upper end of the arm $t^{17}$ is subject to a cam $t^{21}$, that is carried by the tens-carrying shaft $a^{14}$ of the register mechanism.

Normally, the safety bar $t^{10}$ stands in such position that the shoulders $c^4$ and $k^2$ of the register bars $c$ and of the zero bar $k$, will clear the same and thus permit the said bars to be raised at their rear ends as required for the setting of the unit pins and of the zero bar pin. When however, the error correcting key is depressed, the arm $t^{17}$ will be forced forward and through the link $t^{16}$, acting on the rod $t^{14}$, will cause the safety bar $t^{10}$ to move slightly rearward, and thereby, overlie the shoulders $c^4$ and $k^2$ of the said register bars $c$ and zero bar $k$. Also, since the tens carrying shaft is connected to pinion $a^{16}$ by a oneway clutch and through gear $a^{17}$, meshing with pinion $a^{16}$ and the rack $c^7$ of the operating carriage, said shaft $a^{14}$ and the cam $t^{21}$, thereon, will not turn during the forward movement of the operating carriage, but on its return movement, the clutch will lock the shaft $a^{14}$ to pinion $a^{16}$ and be rotated, together with cam $t^{21}$ in the direction of the arrow shown in Fig. 10; and the cam $t^{21}$ acting on arm $t^{17}$ and through the link bar $t^{16}$ and rod $t^{14}$, will move the said safety bar $t^{10}$ over the shouldered portions $c^4$ and $k^2$ of the said register bars, and zero bar. This safety bar $t^{10}$ thus serves to positively lock in their normal positions, and against vertical movement, the rear ends of the register bars and zero bar, so that the said bars cannot be raised while their pins are being restored to normal positions, by the upward movement of the platform $c^{47}$ and its projection $k^{19}$, which as already stated takes place just before the operating carriage is returned to normal position. Otherwise stated, the said safety bar $t^{10}$ will hold down the register bars and zero bar while the set unit pins and zero pin (if the latter should happen to be set), are being restored to normal positions, under the control of the error correcting key, or while the said pins are being restored to normal positions after each operation, under the return movement of the carriage. It is obvious from the foregoing description, that the register bars are locked against vertical movements if hand lever $c^{13}$ is only partially restored to its normal position, with the result that the typewriter carriage would be blocked in its operative movement as soon as the selecting dog $f$ comes in contact with one of the selecting levers $f^1$, because the forward ends of the latter cannot be raised unless the register bars $c$ can be lifted at the same moment, which stoppage gives notice to the operator that something is wrong, which must be remedied, by pushing the hand lever farther back, before he can proceed with the work.

In the description of the typewriter, brief mention has been made in regard to shift key locking mechanism which prevents the supplemental carriage $2^a$ from rising, when in normal position, and that this feature has an important relation to the decimal order selecting mechanism, which feature will now be explained.

By referring to Figs. 3 and 4, it will be remembered that the supplemental carriage $2^a$ is supported by arms 8, the latter are mounted on the rock shaft 9, on which are also mounted the rearwardly extended arms $f^4$, carrying the two rods $f^5$ and $f^6$, on which the selector block or arm $f^7$ is slidably mounted.

The action of the shift keys 6 on bell cranks 12, guide rod 11 and wheel 10, serves to raise the supplemental carriage $2^a$ as heretofore noted, and thereby slightly rotates rock shaft 9 in such manner that the free ends of arms $f^4$ are tilted downward sufficiently to cause selecting dog $f$ to pass under and clear of levers $f^1$. If there were no preventive means said selecting dog $f$ might pass under said levers $f^1$ without operating on, or lifting, the latter sufficiently to raise the register bars high enough to present the unit pins to the key actuated unit bars $b^7$, when said carriage $2^a$ is in its normal position, because the resistance of all the parts operated by said levers $f^1$ might overcome the force which holds the supplemental carriage $2^a$ in such position, and thus would cause the arms $f^4$ to be tilted downward, thereby reversing the intended action of the dog $f$ and levers $f^1$, so that the latter becomes operative on the former instead of the dog being operative on the latter. Such action, however, becomes impossible when the lock mechanism described is in the normal position shown in Fig. 4, in which position the supplemental carriage $2^a$, is prevented from rising and rock shaft 9 prevented from rotation, by lock pin 15 resting in the rear upwardly extended notch of cam slot 16, until released by the action of one of the shift keys 6 when depressed.

If, from any cause, the so-called transposing bars $f^{23}$, or any one thereof, should happen to be held in a raised position, (as would happen if the selecting dog $f$ should remain in engagement with one of the selecting levers $f^1$ while the operating carriage is being given a return movement), the rear ends of a register bar would engage and bend or break the upwardly extended lugs $f^{29}$ of such raised transposing bar.

To prevent this, a depressing arm $t^{22}$ is secured to a rock shaft $t^{23}$, (see particularly Figs. 8 and 24), and this rock shaft is provided with a down turned arm $t^{24}$ that engages in a notch $t^{25}$ formed in one of the rack bars $c^7$ of the operating carriage. Normally, the depressing arm $t^{22}$, the end portion of which overlies the several transposing bars $f^{23}$, stands high above said bars, as shown in Fig. 24. When however, the operating carriage is given its forward movement, the said arm $t^{22}$ is forced downward onto the said transposing bars $f^{23}$, and positively depresses the same to their normal positions, with their lugs $f^{29}$ below the rear ends of the register bars. When the said transposing bars are thus positively forced downward to their normal positions, while their selecting lever is engaged by the selecting dog, the corresponding connecting rod $f^{15}$, will necessarily be sprung and buckled slightly, to permit such movement, but will assume its original shape as soon as the pressure is removed. The depressing arm $t^{22}$ is held in normal position by spring $t^{26}$, one end of which is attached to the rock shaft $t^{23}$, and the other to case 30.

Referring to Figs. 1, 3 and 43, in which is shown a reversible register decimal order indicator, $m^1$ indicates the indicator, $m^2$ the differently spaced pointers, $m^3$ buttons for holding the indicator when reversing its position, $m^4$, locking pins extending down through the casing or top cover of the computer, $m^5$, a bar fastened to the underside of the top cover, $m^6$ a recess in each end of said bar, and $m^7$ two spring pressed balls in the ends of bar $m^5$, said balls engaging the reduced portions on locking pins $m^4$ for holding the indicator on the top cover. The recesses in bar $m^5$ are slightly reduced at the ends of said bar so that the balls cannot fall out when the indicator is removed.

Operation.

The operation of the machine above described, in most respects, is probably clear from the detailed description of the different groups of mechanisms, and statements made as to the operations thereof. It is, thought however, that the following remarks and further statements of operations will be found serviceable.

Generally stated, this improved machine will do the same character of work that can be done on the machine disclosed and claimed in the above noted Hanson Patent No. 905,422.

Several items of a bill or invoice may be listed, and the amount added; numbers may be added and listed in several vertical columns; and numbers may be added and listed in a horizontal line crosswise of the sheet, like this, 45.65; 163.22; 13.23; 5.02; .50; 1.00; 2274.20; 4.00—2506.82

The numeral keys can be used for printing numerals, without adding the same, in any place, except in the so-called adding zones. For instance in making out a bill or invoice, including an item, such as, 10 lbs. sugar   @5¢ per lb.   .50 the numeral keys when used to print numbers in connection with the item, will not actuate the computing mechanism, because the selecting dog will then be out of the adding zone, or in other words, will not be in a position for action on any one of the selecting levers. When however, the selecting dog is in position for action on one of the selecting levers $f^1$, and one of the numeral keys is then depressed, the said depressed key operates, through the unit bar mechanism described, to set the corresponding unit pin in a lifted register bar.

The several registers and coöperating preliminary representation devices, are of course, provided for the purpose of adding and listing numbers in several vertical columns. This also requires that the selecting dogs which operate on different groups of levers, and also the corresponding ends of the said groups of levers, be set for engagement on different lines, so that each dog will operate only on its coöperating levers and will clear the levers of the other groups.

This is preferably done by varying the lengths of the selecting levers $f^1$ in the several groups, as best shown in Fig. 1, by reference to which it will be noted, that the levers of the right hand group are shorter, while the levers of the left hand group are longer than the levers of the intermediate group. It will also be noted that the several selecting dogs are correspondingly mounted in the supporting blocks, or in other words, are offset so that they will engage only with the ends of the levers of corresponding groups, and furthermore, that just to the rear of the extreme forward ends, the said levers are undercut, leaving beveled teeth at the forward ends thereof, in the path of travel of coöperating selecting dogs, and affording clearance for the other dogs, past the said beveled tooth portions, either in front or to the rear thereof. Also, the supporting blocks $f^7$ should be so spaced that no two selecting dogs $f$ will operate under coöperating groups of levers at the same time, but will operate under different portions of the operative movement of the typewriter carriage.

To provide for the adding and listing of numbers in a horizontal line or crosswise of the sheet, only a single register with coöperating preliminary representation devices and decimal order selecting mechanism is required, but this decimal order selecting mechanism must comprise a plurality of selecting dogs, so-called, arranged for successive action on the same selecting levers, and there must be one such selecting dog for each number that is to be listed and added crosswise of the sheet. Hence, to do the cross listing and adding, just above illustrated, would require eight of these selecting dogs. In Fig. 30, three such selecting dogs are shown, and by reference to said view, it will be noted, that all of these selecting dogs are alined in respect to the direction of travel of the typewriter carriage, and are so located, that under the operative movement of the typewriter carriage, the first selecting dog toward the left, will first operate upon the selecting levers $f^1$ and punctuation levers $g$, in a direction from the right toward the left, and the second, and third and other selecting dogs, will be brought into action in the order named, upon the said group of levers $f^1$ and $g$. As the blocks $f^7$, which support the said selecting dogs, are adjustable on the rods $f^5$ and $f^6$, in a direction of the movement of the typewriter carriage, they may, of course, be set so as to give any desired spacing between the cross listed numbers; and by pivotal movements of the said supporting block $f^7$ on the rod $f^5$, the said selecting dogs may be set, at will, either in their operative or in their inoperative positions. Also, as before described, the supporting blocks $f^7$, with their select ing dogs, may at any time be removed from their supporting rod $f^5$, by moving the same first to the reduced left hand end $f^{51}$ of said rod.

With the arrangement of selecting levers $f^1$ and the punctuation levers $g$ described, it is a very easy matter to vary the kind of punctuation that will be done. It should be remembered that selecting levers $f^1$, and punctuation levers $g$, are identical in construction, and so are the rods $f^{15}$ and $g^1$, and that the lower levers $f^{16}$ and bell cranks $g^2$, are for two different purposes, viz: to lift the register bars, and lock the numeral keys when the punctuation space is opposite the printing point. Such being the case, it follows that the action of selecting dog $f$ on levers $f^1$ and $g$, and transmitted to levers $f^{10}$ and bell cranks $g^2$, can be made variable on the latter, according to the location of the levers $g$, and that such location is determined solely by connecting bell cranks $g^2$, through rods $g^1$ to some of the levers $f^1$, in which case such levers $f^1$ become levers $g$, or eliminating such connection altogether by removing rods $g^1$ from the machine, which is easily done, by turning the free end of bail $f^{10}$ upward, which releases the rods so they can be removed from the bell cranks by simply lifting them upward from the open seats in the rearwardly extending arms of bell cranks $g^2$.

From this description, it is also easy to understand that levers $f^1$ and $g$ are thus designated for the purpose of explaining their functions only, and that, in case the punctuation is to be changed from denoting dollars and cents to denoting hundreds, thousands and hundreds of thousands, said levers $f^1$ and $g$ will change functions, although remaining in their respective places, depending on the order in which rods $g^1$ are connected to said levers.

For instance, with rods $g^1$, arranged as the fourth and eighth members from the right, in respect to Fig. 1, and as the fourth and eighth members from the left, as shown in Fig. 5, and connected to corresponding members or levers, marked $g$, the punctuation will be like this:

645,387.29

With the said rods $g^1$ arranged at their upper ends as the third and seventh members from the right, in respect to Fig. 1, or as the third and seventh members from the left, as shown in Fig. 6, which arrangement is accomplished by crossing rods $g^1$ with rods $f^{15}$, as shown, the lower ends of all the rods remaining in their normal positions, indicated in Fig. 5, making said rods $g^1$ subject to corresponding third and seventh levers from the left, in Fig. 6, thereby causing the punctuation-space key-locking mechanism to be actuated one step in advance of that shown in Fig. 5, hence the punctuation in this case will be like this:

64,538,729

With the rods $g^1$ removed, as indicated in Fig. 7, and rods $f^{15}$ arranged as shown, levers $f^1$, act in succession on said rods, and levers $g$, shown as now being at the left hand side, have no connections with bell cranks, $g^2$, hence the punctuation-space key-locking mechanism is not actuated, which permits the figures to be printed solid, like this:

64538729

The notched guide plate $f^{18}$ and bail $f^{19}$, make the various adjustments of the upper ends of the rods, and their ready connection with or disconnection from any of the levers, a very easy matter.

It will be remembered that the punctuation-space key-locking mechanism operates only when the punctuation space on the paper is opposite the printing point, from which it follows, that while a numeral cannot be printed in the punctuation space, that the desired mark, such as a comma or period, may, nevertheless, by striking the proper character key, be printed in such space, or this punctuation space on the sheet may be left blank, if desired, by simply striking the space bar.

Before starting to do a piece of work, all the parts must, of course, be in their proper adjustment with respect to the location on the paper of the printed column, or columns, to be added, and for purposes of such adjustment, the tabulating stops of the typewriter are set in proper positions, which determines the location of a column on the paper. Next, the block or arm carrying the selecting dog $f$, is moved longitudinally of its supporting rod until the pointer $f^{10}$ is opposite a number on the scale $f^{11}$ that corresponds with the number on the tabulating stop scale, when the said block is locked with the rod $f^5$ as heretofore described.

In order to regulate the return movement of the typewriter carriage to initial position, for each new line, the right hand margin stop 25 is set at such point, indicated on the front scale 23, as it is desired to begin a new line, and the pinion supporting arm $c^{42}$ on the operating shaft $c^{13}$ of the computer, is so set on gear $c^{39}$, and with respect to the pinion $c^{40}$ on the hand lever $c^{13}$, that a full forward movement of said lever, brings the typewriter carriage against the right hand marginal stop.

The register, or registers, must also be "clear" or at zero, before beginning operations, which is accomplished by pressing the zero keys of the several registers, and giving the hand lever a complete forward and backward oscillation.

If only one column is to be added, the selector carrying blocks $f'$, for the registers, not to be used, are swung to a vertical position, shown by dotted lines in Fig. 29, in which position, the selector is inoperative. If more than one column is to be added, said blocks are adjusted to operative positions, with respect to corresponding tabulating stops, the same as for one column work.

The machine is then ready for operation. The general operation of this class of machines is so well understood that it is deemed unnecessary to explain the same in detail.

When it is desired to add numbers written in a horizontal line, the operator first decides on which register the adding is to be done; and next he removes from their supports, the selector blocks $f'$ corresponding to the registers that are to remain idle, and puts on additional selector blocks corresponding to the register selector for use, one such selector block being required for each number in the written line. The pinion supporting arm $c^{42}$ is set far enough away from the intercepting pinion $c^{40}$ on the hand lever, so as to prevent the latter from being operative on the former, with the result that the typewriter carriage is not returned, nor is the paper fed for line spacing when the hand lever is operated.

After writing the first number in the adding zone, the hand lever is oscillated, accumulating on the register the number written, whereupon the typewriter carriage, by means of its tabulating mechanism, is adjusted to the second adding zone, and the second number is written, the hand lever is again operated, and the second number is added to the first on the register, and the typewriter carriage is adjusted to its third adding zone, and the same process is repeated until the last number in the line has been written and transferred to the register, where the total of all numbers added will appear and can be copied on the paper, as shown in the example above, and, if desired, the total of each line may be accumulated on one of the idle registers, whereafter the first register is cleared, in the manner already described, the typewriter carriage is returned, and the paper fed, by pushing the former back to initial position by hand, as in ordinary typewriting, and thus horizontal lines may be added and at the same time the grand total thereof ascertained.

If the operator makes a mistake in depressing the wrong numeral key wha writing figures in the adding zone, and becomes aware of such mistake before the amount has been transferred to the register, he can correct it on the paper in the customary way by erasure, and depress the error key of the register, on which the wrong number would be accumulated, if not corrected, which will restore all the set unit pins in the register bars of such register, to normal positions, after which the correct number may be rewritten on the paper. On account of the fact that the error key is connected for co-operation with the register bar locking bar $t^{10}$, the error key cannot be depressed while any register bar is in a raised position, hence, it is necessary to move the typewriter carriage to such position that the selecting dog $f$ is not in operative position on the selecting levers $f^1$.

In case a figure is not clearly imprinted on the paper, and it is desired to make such imprint more clear, it is only necessary to adjust the typewriter carriage to the proper position and strike the key a little harder a second time, which will not affect the adding mechanism and add the number a second time, as would be the case if the numbers were added directly by depression of the numeral keys.

The connection heretofore described, whereby the tabulating keys move a shift key, and whereby the movement of either of the shift keys will not move a tabulating key, is important. With this construction, it follows, that when a tabulating key is depressed, the supplemental frame $2^a$ of the typewriter carriage 2 will be raised, through the connections shown in Fig. 4, and the arms $f^4$ will be rocked downward, simultaneously with the release of the typewriter carriage from its escapement mechanism, the selecting dogs $f$ will be thrown into positions below the toothed front ends of the co-operating levers $f^1$ and $g$, and hence, will pass under and out of engagement with the same, when the typewriter carriage makes a movement toward the left to a position determined by which one of the tabulating keys is depressed. This avoids unnecessary wear between the selecting dogs $f$ and levers $f^1$ and $g$.

Whenever either of the shift keys is depressed for presenting the paper to the upper case characters, the connection between the typewriter and adding mechanism is broken, in the manner just described above, by the rocking of arms $f^4$ downward so that the selector dog $f^1$ passes under and clear of the levers $f^1$ and $g$, thus permitting the use of the upper case characters on the numeral keys to be printed in the adding zone without affecting the adding mechanism.

The upper case character on numeral key 6 is generally a short horizontal line like this ——, used for underscoring words or passages in the written text, and in connection with the adding mechanism described in this case, can be used for making a line between the column added and the printed total, like this:

$$\begin{array}{r} 24 \\ 36 \\ 50 \\ \hline 110 \end{array}$$

without affecting the adding mechanism, so that the total shown on the register is not disarranged by using the numeral key for the purpose described.

The same object may also be attained by swinging selector block $f^7$ to its upward inoperative position. If block $f^7$ is not so positioned before printing the total, the adding mechanism is affected, by setting up a number on the preliminary representation devices corresponding to the total, which can be eliminated by depressing the error key.

It has already been explained that the grand total of numbers, written on horizontal lines and added together, may be accumulated on another register. The accumulation of the totals of horizontal lines may be accomplished in two different ways according to the choice of the operator.

The simplest way, in a machine constructed as shown in the drawings, is to use only one selector block $f^7$ for the register selected to accumulate the totals, and located on its support at a point where its selector dog $f$ becomes operative on its coöperating levers $f^1$ simultaneously with the printing of the total of each line on the paper.

Another way to accomplish the same result is to use as many selector blocks $f^7$ for the grand totaling register as there are items to be written in the horizontal line, and so located that their selector dogs $f$ will become operative simultaneously with corresponding dogs $f$ for the register selected to accumulate the individual items in a line.

The accumulation of the same number on both registers will, in such case, take place simultaneously, but at the completion of the computation of each line, the operator "clears" the register used for accumulating the individual items of the line, so that no higher amount will be registered on said register than the combined value of all of the items of such line, but the other register will continue to accumulate the items of all the lines. This method makes it unnecessary to print the total at the end of the line, if the work in hand does not require it, and it also insures the correctness of the grand total because the same individual items have been simultaneously accumulated on both registers.

I believe it new and desire to claim any construction in which the same registers can be interchangeably used for several different kinds of work.

The machine illustrated in the drawings shows three registers, which number may be increased or decreased, according to the kind of work a machine is intended for.

Assuming that the machine has a greater number of registers than illustrated, it becomes practical to compute simultaneously the individual items composing vertical columns and horizontal lines and the totals of the latter, so that, at the end of a computation, the total of each column, the total of each line, and the grand total of all the columns, and necessarily also the total of each line and the grand total thereof, is ascertainable at once at the end of the computation.

In such case the work can be accomplished in either of the two ways described for adding items written in a horizontal line on one register, and accumulating the grand total thereof on another register, but on account of the great number of selector blocks $f^1$ required to accumulate simultaneously the same item on three registers, the operator may prefer to follow the method about to be described, but he is at liberty to choose the other method if that is deemed preferable.

As an illustration, the following numbers are printed so as to form vertical columns as well as horizontal lines:

| 10.12 | 3.40 | 13.52 |
|---|---|---|
| 1.82 | 2.20 | 4.02 |
| 11.94 | 5.60 | 17.54 |

The two columns to the left show the individual items and the totals thereof, and the right hand column shows the totals of each horizontal line and the grand total of same, which is also the total of the footings of the vertical columns.

The manner of operating the machine to secure this result will be briefly explained. A fourth register is required to do the work illustrated above, and for the purpose of better defining the nature of the work of the several registers I will designate them as follows: column registers, line totaling, and grand totaling, registers, respectively, which terms clearly indicate the work of each register.

For the line totaling register as many selector blocks $f^7$ are required as there are columns, or items in the horizontal line, and only one block $f^7$ for each of the other registers, and the said block $f^7$ for the first column register and the first block $f^7$ for the line totaling register, must be set in operative positions at such points that they are simultaneously operative on levers $f^1$ of equal decimal values, coöperating with the two groups of preliminary representation devices controlling the said two registers, and block $f^7$ for the second column register, and the second block $f^7$ for the line totaling register, must be set so as to be also simultaneously operative on their coöperating levers $f^1$, and the block $f^7$ for the grand totaling register must be set at such point as to become operative on levers $f^1$ for such register simultaneously with the printing of the total of each horizontal line, and operative on levers having the same decimal values as the digits in the printed number.

The blocks $f^7$ and the tabulating stops of the typewriter having been adjusted with respect to the location of the printed columns and to each other, the work may begin by adjusting the typewriter carriage, through depressing the proper tabulating key, to the proper place, and the first number, 10.12 is then printed on the paper, which causes the simultaneous setting of preliminary representation devices of the same value, in the groups controlling the first column register and the line totaling register, the operating handle is then oscillated, which causes said number 10.12, to be simultaneously accumulated on said two registers; the typewriter carriage is next adjusted to the second adding zone position and 3.40 is printed, which causes preliminary representation devices of the same value, to be simultaneously set in the groups which control the second column register and the line totaling register, the handle is again oscillated, and that value is simultaneously accumulated on said two registers, which results in 3.40 appearing on the second column register, but as 10.12 had been previously accumulated on the line totaling register the amount 13.52 will now appear thereon. The typewriter carriage is now adjusted to the third adding zone position and the operator copies from the line totaling register the amount appearing thereon, or 13.52, which is the total of the items in the first line, and simultaneously with the printing of said number, the value thereof is set up on the preliminary representation devices which control the grand totaling register, and the handle is again operated and the value transferred to said grand totaling register.

The operator "clears" the line totaling register before beginning the writing of a new line and also sets back the typewriter carriage by hand, which automatically feeds the paper one line space, and the typewriter carriage is adjusted to proper position in the first adding zone and the item 1.82 of the second line is printed, and the oscillation of the handle causes said amount to be accumulated on the first column register and also on the line totaling register. As 10.12 had previously been accumulated on the first column register the amount indicated thereon is now 11.94, but the line totaling register was "clear" and 1.82 is indicated on said register. The typewriter carriage is then adjusted to the proper position in the second adding zone and 2.20 is printed, the handle is oscillated and said amount is transferred to the second column register and also to the line totaling register. On the second column register 3.40 had been previously accumulated, consequently, with 2.20 added to that amount said register will now indicate the combined value of said two amounts, or 5.60, and the line totaling register indicates the value of the two items composing the second line, or 4.02, which latter amount is next printed and accumulated on the grand totaling register, which amount being added to the previous amount of 13.52, causes said register to indicate the sum of 17.54, which is the grand total of the footings of the vertical columns as well as of the cross-footings, and the operator may now "clear" the line totaling register and proceed to copy the totals appearing on the various registers and print the same under the respective columns, as indicated in the example illustrated, the same as in ordinary typewriting and as previously explained.

Wherever the term "column" has been used herein it is understood to mean one or more rows of figures grouped together, the denominational orders of which may be subdivided by punctuation marks or spaces, in order to easier distinguish the same.

What I claim is:

1. In a combined typewriter and computing machine, the combination with registers having decimal orders, of a traveling carriage, and interchangeable like and unlike decimal order selectors carried by said carriage for controlling the selection of numbers to be added, which are printed in columns or on horizontal lines.

2. The combination with a plurality of registers, of means for accumulating individual items of different values on some of said registers, designated as column-registers, and means for accumulating an individual item on another register, designated as a line-totaling register, simultaneously with the accumulation of such item on one of said column-registers, any register being usable either as a line-register or a column-register.

3. The combination with a plurality of registers, of means for accumulating individual items on some of said registers, designated as column-registers, means for accumulating an item on another register, designated as a line-totaling register, simultaneously with the accumulation of such item on one of the column-registers, and means for accumulating all of such items on another register, designated as a grand-totaling register, any register being usable either as a line-register, a column-register, or a grand-totaling register.

4. The combination with a typewriting machine having numeral keys and a plurality of registers, of means for accumulating individual items on registers, designated as column-registers, under control of said keys, means for accumulating individual items on another register, designated as a line-totaling register, simultaneously with the accumulation of each item on one of the column-registers, means for selecting the line-totaling register, and means for clearing any one of said registers independently of the others and independently of said keys, whereby different registers may be used either as a column-register or as a line-register.

5. The combination with a plurality of registers, means for actuating said registers, some of said registers usable as column registers and at least one of said registers usable as a line totalizing register to accumulate the sum of the items simultaneously with the accumulation of individual items on the column registers and means for controlling said registers at will to determine which register shall be usable as a column register and which as a line-register.

6. The combination with a plurality of registers, of a plurality of computing devices for each register, a plurality of preliminary representation devices for each of said registers, selectors for simultaneously setting two, or more, preliminary representation devices of equal digit and decimal values, and means for simultaneously actuating two, or more, registers for the purpose of accumulating individual items on some of said registers, and the total value of such individual items on other selected registers.

7. In a combined typewriting and computing machine, the combination with a plurality of registers, of a traveling carriage, typewriter keys controlling said carriage, and means to enable said keys to control the computation of numbers of different values on any of said registers and to enable any one of said registers to indicate the joint result of the computation made in all the other registers, said means adjustable along the carriage run to determine the action of said keys on said registers for any column determined by said carriage.

8. The combination with printing devices, of a plurality of registers having decimal orders, groups of preliminary representation devices controlling said registers, means for simultaneously setting up numbers on more than one group of preliminary representation devices, the numbers thus set up corresponding in digit and decimal values to the printed numbers, means for accumulating the value of the numbers printed in a plurality of columns on registers corresponding to said columns, and a register comprising means for accumulating thereon all the individual numbers printed in the several columns.

9. The combination with printing devices adapted to print numbers in a plurality of columns, of preliminary representation devices on which numbers are set up simultaneously with the printing thereof, a plurality of registers under control of said preliminary representation devices and corresponding to the printed columns, means for accumulating on each register the value of the number printed in its corresponding column, an additional register common to all of said printed columns, and means for accumulating on said register all the numbers printed in the several columns simultaneously with the accumulation of such numbers on the other registers, whereby the total of the individual items in each separate column, and the grand total of all the individual items composing the several columns, are constantly indicated during the progress of the computation.

10. The combination with a paper supporting carriage having movements for letter and column spacing, of means for printing numbers in columns, a plurality of registers corresponding to the printed columns, said registers being stationary with respect to the movements of said carriage, means for adding the numbers printed in each column on the register corresponding to any column, and means for adding together all of the numbers in all of the columns on any register, which is then common to all of said columns, simultaneously with the adding of such numbers on the other registers.

11. The combination with printing devices for printing numbers in columns or transverse lines on the work-sheet, of a plurality of registers, separate preliminary representation devices for each register, and means selectively controlling said preliminary representation devices for causing any one of said registers to compute numbers printed in column formation or transverse lines on the work-sheet.

12. The combination with a plurality of registers having decimal orders, of numeral printing devices, digit selecting means common to all of said registers, decimal order selectors individual to at least two of said registers and a plurality of decimal order selectors individual to one of said registers, whereby the same decimal orders may be selected in a plurality of registers so that the numbers printed in columns in different zones may be simultaneously computed on a plurality of registers.

13. The combination with printing devices for printing numbers in a plurality of columns, of a plurality of registers corresponding to the printed columns, means for selecting one or more registers to accumulate the numbers printed in all of the columns and means for varying the location of the printed columns, as desired, with respect to each other.

14. The combination with printing devices for printing numbers in a plurality of columns, of a plurality of registers corresponding to the printed columns, a register common to all of said columns, means for varying the location on the paper of the printed columns, as desired, with respect to each other, preliminary representation devices controlling the registers, means for setting up a number on said preliminary representation devices simultaneously with the printing thereof, and means for subsequently transferring simultaneously the number set up on the preliminary representation devices to more than one of said registers.

15. The combination with registers having decimal orders, decimal order selecting means individual to each register, and like and unlike decimal order selectors for coöperation with said decimal order selecting means for controlling the denominational selection of numbers to be cross-added.

16. The combination with a plurality of registers, of means for accumulating individual items of different values on some of said registers to be used as column-registers including denominational selectors individual to said registers, and means for accumulating said individual items on another register designated as a line-totaling register simultaneously with the accumulation of such items on one of said column-registers, said accumulating means including a denominational selector which may be like any one of said first-mentioned denominational selectors, said denominational selectors being interchangeable, whereby any register may be usable either as a line-register or as a column-register.

17. The combination with printing devices, of a plurality of registers, indexing devices for said registers, means for accumulating the numbers indexed and printed in a plurality of columns on the registers corresponding to said columns, and a register for accumulating all of the individual items printed in the several columns.

18. The combination with printing devices of a plurality of column-registers for accumulating numbers printed by said devices, a cross-footing register for simultaneously accumulating the items as printed in each column-register, and means for, at will, rendering more than one of said plurality of column-registers a cross-footing register.

19. The combination with printing devices for printing numbers in a plurality of columns, of registers corresponding to the printed columns, means for selecting one or more registers to be common to all of said columns, and means for computing simultaneously on two or more of the selected registers the numbers printed by the printing devices.

20. In a computing machine, the combination with printing mechanism, of computing mechanism, a traveling carriage to determine the printing of numbers in different adjustable columns, said computing mechanism including a plurality of cross-computing registers, and means for selectively rendering different ones of said cross-computing registers effective to compute the numbers printed in columns variably positioned on the work-sheet, whereby numbers printed in different groups of columns may be separately cross-footed.

21. In a computing machine, the combination with a printing mechanism and computing mechanism including a plurality of cross-computing registers stationarily mounted, of means for selectively rendering different ones of said cross-computing registers effective to compute the numbers printed, whereby the numbers printed in a plurality of groups of columns may be separately cross-footed.

22. In a computing machine, the combination with printing mechanism, of computing mechanism, a traveling carriage to determine the printing of numbers in different columns, said computing mechanism including a plurality of cross-computing registers, means for selectively rendering different ones of said cross-computing registers effective to compute when said carriage is in different selected columns, whereby numbers printed in a plurality of groups of columns may be separately cross-footed; and means for separately footing single columns.

23. In a computing machine, the combination with printing mechanism, registering mechanisms, and a traveling carriage to determine the printing of numbers in different columns, of means for controlling said registering mechanisms to separately cross-foot the numbers printed in a plurality of groups of columns, and to separately foot the numbers printed in single columns.

24. In a computing machine, the combination with printing mechanism, registering mechanisms, and a traveling carriage to determine the printing of numbers in different columns, of means adapted to be effective automatically during a single run of the carriage for controlling said registering mechanisms to separately cross-foot the numbers printed in a plurality of groups of columns, and to separately foot the numbers printed in single columns.

25. In a computing machine, the combination with printing mechanism, registering mechanisms, and a traveling carriage to determine the printing of numbers in different columns, of means for controlling said registering mechanisms by the carriage during a single run thereof to separately cross-foot the numbers printed in a plurality of groups of columns, and to separately foot the numbers printed in single columns.

In testimony whereof I affix my signature in presence of two witnesses.

FREDERICK A. HART.

Witnesses:
W. M. DYORKMAN,
LYMAN D. BROUGHTON.